US012807447B2

(12) United States Patent

Yamaguchi

(10) Patent No.: US 12,807,447 B2
(45) Date of Patent: Nov. 24, 2026

(54) PRINTING APPARATUS

(71) Applicant: BROTHER KOGYO KABUSHIKI KAISHA, Nagoya (JP)

(72) Inventor: Ryoji Yamaguchi, Tokai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 730 days.

(21) Appl. No.: 18/191,870

(22) Filed: Mar. 29, 2023

(65) Prior Publication Data

US 2023/0312275 A1 Oct. 5, 2023

(30) Foreign Application Priority Data

Mar. 29, 2022 (JP) ................................ 2022-053825

(51) Int. Cl.
*B65H 26/08* (2006.01)
*B41J 15/04* (2006.01)
(Continued)

(52) U.S. Cl.
CPC .............. *B65H 26/08* (2013.01); *B41J 15/04* (2013.01); *B65H 16/02* (2013.01); *B65H 16/04* (2013.01);
(Continued)

(58) Field of Classification Search
CPC ...... B65H 26/00; B65H 26/08; B65H 23/025; B65H 16/00; B65H 16/02; B65H 16/028; B65H 16/04; B65H 16/06; B65H 16/08; B65H 16/10; B65H 16/106; B65H 1/00; B65H 1/02; B65H 1/022; B65H 1/025; B65H 1/027; B65H 1/04; B65H 5/00;
(Continued)

(56) References Cited

U.S. PATENT DOCUMENTS 5,572,630 A * 11/1996 Azuma ............. H04N 1/32363 358/1.14
5,820,068 A * 10/1998 Hosomi .................. B41J 11/70 242/563.2
(Continued)

FOREIGN PATENT DOCUMENTS

JP H07172623 A 7/1995
JP 2014-177318 A 9/2014
(Continued)

*Primary Examiner* — Victoria P Augustine
*Assistant Examiner* — Raveen J Dias
(74) *Attorney, Agent, or Firm* — KENEALY VAIDYA LLP

(57) ABSTRACT

Printing apparatus includes a paper support configurated to support a sheet body, a TOF sensor configured to detect a distance to the sheet body, a conveyor configured to convey a sheet medium in the sheet body, a printing device configured to print on the sheet medium conveyed by the conveyor, and a controller. The controller is configured to execute remaining amount detection processing that detects a remaining amount of the sheet medium based on a detection result of the distance to the sheet body by the TOF sensor, and calibration processing that corrects distance detection deviation of the TOF sensor based on a detection result of a
(Continued)

distance to a predetermined detection object by the TOF sensor in a predetermined state in which a distance from the TOF sensor to the detection object is a predetermined value.

4 Claims, 22 Drawing Sheets

(51) Int. Cl.
*B65H 16/02* (2006.01)
*B65H 16/04* (2006.01)
*B65H 16/08* (2006.01)

(52) U.S. Cl.
CPC ......... *B65H 16/08* (2013.01); *B65H 2402/44* (2013.01); *B65H 2402/441* (2013.01); *B65H 2402/45* (2013.01); *B65H 2511/22* (2013.01); *B65H 2553/00* (2013.01); *B65H 2553/40* (2013.01); *B65H 2553/412* (2013.01); *B65H 2553/414* (2013.01); *B65H 2553/80* (2013.01); *B65H 2553/81* (2013.01); *B65H 2553/83* (2013.01); *B65H 2557/61* (2013.01); *B65H 2701/182* (2013.01); *B65H 2701/184* (2013.01); *B65H 2801/03* (2013.01); *B65H 2801/12* (2013.01)

(58) Field of Classification Search
CPC ... B65H 5/06; B65H 5/12; B65H 7/00; B65H 7/02; B65H 7/04; B65H 2402/44; B65H 2402/441; B65H 2402/45; B65H 2402/46; B65H 2511/22; B65H 2553/00; B65H 2553/20; B65H 2553/30; B65H 2553/40; B65H 2553/41; B65H 2553/412; B65H 2553/414; B65H 2553/80; B65H 2553/81; B65H 2553/83; B65H 2557/61; B65H 2701/184; B65H 2701/1842; B65H 2701/182; B65H 2701/1822; B65H 2701/1826; B65H 2801/03; B65H 2801/06; B65H 2801/12; B65H 2801/15; B65H 2801/18; B65H 2801/21; B41J 15/00; B41J 15/02; B41J 15/04; B41J 15/042; B41J 15/044; B41J 11/00; B41J 13/00; B41J 13/0009; B41J 13/0018
See application file for complete search history.

(56) References Cited

U.S. PATENT DOCUMENTS 5,980,138 A * 11/1999 Shiozaki ............. B65C 11/0289 400/582
6,279,896 B1 * 8/2001 Linder ..................... B65H 3/48 271/31
6,367,731 B1 * 4/2002 Takizawa ............... B41J 15/165 242/417.3
6,502,784 B1 * 1/2003 Sato ....................... B65H 26/08 242/563.2
11,738,568 B1 * 8/2023 Yuruzume .............. B41J 2/3352 347/211
12,459,277 B2 * 11/2025 Nihashi ................ B41J 11/0075
2002/0109037 A1 * 8/2002 Mizuno ................ B41J 11/0075 242/563
2004/0234316 A1 * 11/2004 Matsuse ................. B41J 15/042 400/613
2005/0002721 A1 * 1/2005 Koyabu ................. B41J 15/042 400/613
2006/0243404 A1 * 11/2006 Scherb ...................... D21F 1/02 162/111
2007/0036604 A1 * 2/2007 Maekawa ................ B41J 29/13 400/615.2
2007/0091159 A1 * 4/2007 Chaussade ............. B41J 15/042 347/108
2008/0095564 A1 * 4/2008 Yada ...................... B41J 15/042 400/613
2008/0162057 A1 * 7/2008 Bongrazio ........... B41J 11/0075 702/33
2008/0267682 A1 * 10/2008 Osawa .................. B41J 15/042 400/120.16
2008/0310903 A1 * 12/2008 Kohyama ........... B41J 11/0045 400/613
2009/0085282 A1 * 4/2009 Yokoyama ............ B41J 15/042 271/226
2009/0152795 A1 * 6/2009 Arrington .............. B65H 26/08 271/9.03
2009/0283565 A1 * 11/2009 Ibanez ................... G01B 21/12 702/158
2010/0028067 A1 * 2/2010 Wanibuchi ............... B41J 15/04 400/621
2010/0247215 A1 * 9/2010 Tsugaru ................. B41J 15/042 226/100
2010/0247217 A1 * 9/2010 Tsugaru ................. B41J 15/042 400/582
2011/0164913 A1 * 7/2011 Tsugaru ............... B41J 11/0075 400/582
2012/0055272 A1 * 3/2012 Sanada .................. B41J 15/042 73/865.8
2012/0224905 A1 * 9/2012 Nihashi .................. B65H 26/08 400/583
2012/0257222 A1 * 10/2012 Jiang ........................ B41J 29/13 358/1.5
2013/0213577 A1 * 8/2013 Matsumoto ............... B65C 9/18 156/387
2013/0222505 A1 * 8/2013 Akatsuka ................. B65H 1/00 347/110
2014/0319755 A1 * 10/2014 Alaas ................. G03G 15/6564 271/110
2015/0151555 A1 * 6/2015 Huang ................... B65H 26/08 347/110
2015/0158681 A1 * 6/2015 Aoki ........................ B65H 3/56 271/147
2015/0328906 A1 * 11/2015 Sumioka ................ B65H 16/02 242/564.5
2015/0343799 A1 * 12/2015 Sanada ................ B41J 11/0075 347/218
2016/0009108 A1 * 1/2016 Nakayama ........... B41J 11/0095 347/16
2016/0214415 A1 * 7/2016 Kawai .................... B41J 3/4075
2017/0121142 A1 * 5/2017 Hagi ........................ B41J 15/04
2017/0259594 A1 * 9/2017 Chiba ...................... B41J 29/13
2017/0348989 A1 * 12/2017 Sanada ................ B41J 11/0095
2018/0099827 A1 * 4/2018 Tsuboi ................. B41J 13/0018
2018/0257408 A1 * 9/2018 Eiyama .................. B65H 16/08
2018/0257892 A1 * 9/2018 Eiyama .................... B41J 11/70
2019/0146730 A1 * 5/2019 Zhu ...................... B41J 11/0095 358/1.9
2019/0236689 A1 * 8/2019 De Brito Ninomia ...................... G06F 3/1204
2019/0287431 A1 * 9/2019 Yamada ............... B41J 11/0075
2019/0291481 A1 * 9/2019 Yazawa ................ B65H 23/085
2020/0001600 A1 * 1/2020 Arakane .............. B41J 2/04563
2020/0156390 A1 * 5/2020 Llosa .................. B41J 11/0075
2020/0198377 A1 * 6/2020 Hiramatsu ............... B41J 11/42
2020/0307929 A1 * 10/2020 Nishimura ............... B65H 1/04
2021/0024307 A1 * 1/2021 Takigawa ................. B65H 7/02
2021/0179380 A1 * 6/2021 Hasegawa ............ B65H 23/185
2021/0237492 A1 * 8/2021 Watari ..................... B65H 7/04
2021/0268814 A1 * 9/2021 Kitagawa .............. B65H 16/08
2021/0300701 A1 * 9/2021 Ichikawa ................. B65H 3/68
2022/0097418 A1 * 3/2022 Matsunaga .......... B41J 11/0075
2022/0097421 A1 * 3/2022 Matsunaga .......... B41J 11/0095
2022/0204299 A1 * 6/2022 Yamaguchi .............. B65H 3/06
2022/0242687 A1 * 8/2022 Ooi ........................ B41J 15/042
2022/0281243 A1 * 9/2022 Ooi .......................... B41J 11/42
2022/0299930 A1 * 9/2022 Daimon ................. B65H 16/02
2022/0355599 A1 * 11/2022 Hirama ................ B41J 11/0075
2023/0166538 A1 * 6/2023 Ishida ...................... B41J 11/42 347/16

(56) References Cited

U.S. PATENT DOCUMENTS

| | | | | |
|---|---|---|---|---|
| 2023/0166935 | A1* | 6/2023 | Ishida | B41J 11/0075 242/570 |
| 2023/0202208 | A1* | 6/2023 | Kanazawa | B41J 11/007 347/4 |
| 2023/0312276 | A1* | 10/2023 | Kawaguchi | B65H 1/14 271/109 |
| 2023/0373233 | A1* | 11/2023 | Nihashi | B41J 15/04 |
| 2024/0351814 | A1* | 10/2024 | Nomura | B65H 16/04 |
| 2025/0332849 | A1* | 10/2025 | Lin | B41J 11/0095 |

FOREIGN PATENT DOCUMENTS

| | | | |
|---|---|---|---|
| JP | 2017171302 | A | 9/2017 |
| JP | 2019163104 | A | 9/2019 |
| JP | 2020517938 | A | 6/2020 |
| WO | 2018194682 | A1 | 10/2018 |

* cited by examiner

PRINTING APPARATUS

REFERENCE TO RELATED APPLICATIONS

This application claims priority from Japanese Patent Application No. 2022-053825 filed on Mar. 29, 2022. The entire content of the priority application is incorporated herein by reference.

BACKGROUND ART

In the related art, an image forming apparatus is known that optically detects the remaining amount of a conveyed sheet medium used a position sensor.

The position sensor used in the related art is a sensor that detects a distance to a detection object to be detected based on a light reception result of light emitted from a light emitting element in a light receiving element, but errors may occur depending on environment in which the position sensor is used by a user. In this case, since no consideration is given to the occurrence of errors, the distance to the detection object to be detected may not be accurately detected, and the remaining amount of the sheet medium may not be accurately detected.

DESCRIPTION

The present disclosure provides printing apparatus that can high-accurately detect the remaining amount of the sheet medium by optically and accurately detecting the distance to the detection object to be detected.

According to an aspect of the present disclosure, printing apparatus includes: a paper support configured to support a sheet body in which a sheet medium is wound in a roll or a plurality of sheet media are stacked; a TOF sensor configured to detect a distance to the sheet body; a conveyor configured to convey the sheet medium in the sheet body accommodated in the paper support; a printing device configured to print on the sheet medium conveyed by the conveyor; and a controller, in which the controller is configured to execute remaining amount detection processing that detects a remaining amount of the sheet medium in the sheet body in the paper support based on a detection result of the distance to the sheet body by the TOF sensor, and calibration processing that corrects distance detection deviation of the TOF sensor based on a detection result of a distance to a predetermined detection object by the TOF sensor in a predetermined state in which a distance from the TOF sensor to the detection object is a predetermined value.

In the printing apparatus of the aspect of the present disclosure, the conveyor conveys the sheet medium provided in the sheet body accommodated in the paper support, and the printing device prints on the conveyed sheet medium. Based on the detection result of the distance to the sheet body by the TOF sensor, the remaining amount of the sheet medium is detected by the remaining amount detection processing executed by the controller.

In the aspect of the present disclosure, the calibration processing is executed by the controller in a predetermined state. The predetermined state is a state in which a distance from the TOF sensor to a predetermined detection object is a predetermined value. In the calibration processing, when the TOF sensor detects the distance to the detection object in the predetermined state, the distance detection deviation is corrected so that a value of the detected distance becomes the predetermined value.

According to the aspect of the present disclosure, since the distance detection deviation of the TOF sensor is corrected by executing the calibration processing, it is possible to optically and accurately detect the distance to the sheet body, which is the detection object to be detected. As a result, the remaining amount of the sheet medium can be detected with high accuracy.

A first embodiment of the present disclosure will be described. In the first embodiment, in printing apparatus in which a roll body is rotatably supported by a shaft member in a paper support, which is so-called shaft hold type printing apparatus, a TOF sensor is calibrated with an opening and closing cover opened.

<Overall Configuration of Printing Apparatus>

Figure 1:
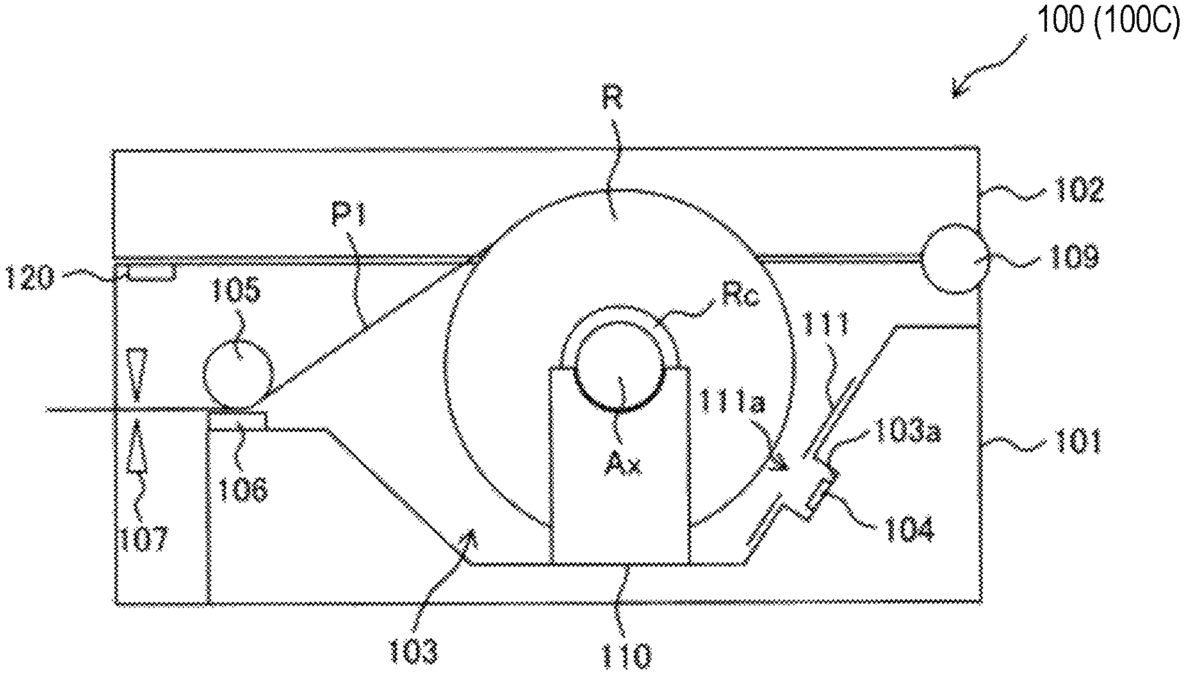
FIG. 1 is a side cross-sectional view showing an example of an overall configuration of printing apparatus according to a first embodiment of the present disclosure with an opening and closing cover closed.
Figure 2:
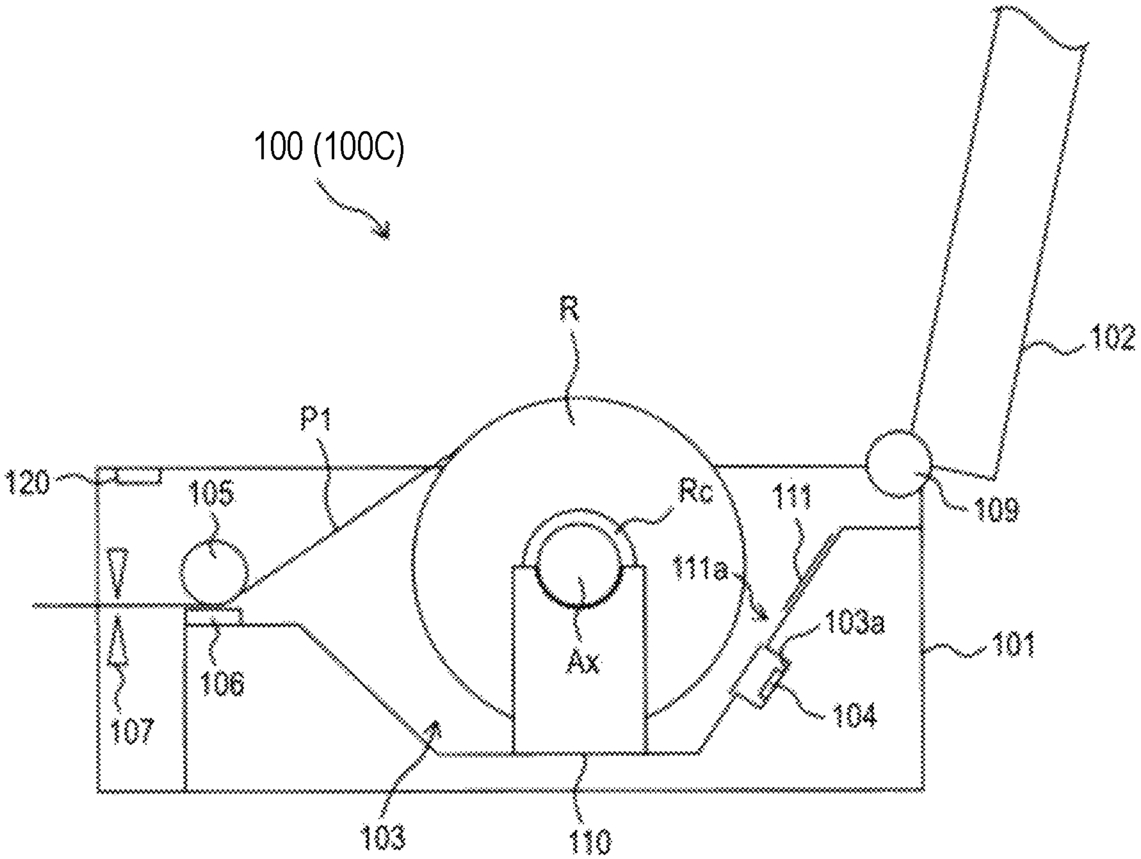
FIG. 2 is a side cross-sectional view showing an example of the overall configuration of the printing apparatus according to the first embodiment of the present disclosure with the opening and closing cover opened.

FIGS. 1 and 2 show an example of an overall configuration of printing apparatus 100 according to the first embodiment. FIG. 1 shows a state in which the opening and closing cover is closed, and FIG. 2 shows a state in which the opening and closing cover is opened.

As shown in FIGS. 1 and 2, the printing apparatus 100 includes a housing 101, an opening and closing cover 102, a paper support 103, a TOF sensor 104, a conveyor 105, a printing device 106, and a cutting device 107, and an opening and closing sensor 120.

The housing 101 includes an outer shell of the printing apparatus 100 together with the opening and closing cover 102. The housing 101 encloses the paper support 103, the TOF sensor 104, the conveyor 105, the printing device 106, the cutting device 107, and the like.

The opening and closing cover 102 is rotatably connected to the housing 101 around a shaft 109. The opening and closing cover 102 opens and closes an opening provided on an upper portion of the housing 101 by opening and closing the housing 101.

The opening and closing sensor 120 is disposed in the housing 101, for example, and detects whether the opening and closing cover 102 is opened or closed. The opening and closing sensor 120 may be a sensor that mechanically detects the opening and closing of the opening and closing cover 102, or may be a sensor that detects the opening and closing optically, magnetically, or by other methods.

The paper support 103 is provided inside the housing 101 and accommodates a roll body R in which a roll paper P1 is wound around an outer periphery of a core member Rc. The roll body R is rotatably supported in the paper support 103 by a pair of support members 110 that support both axial ends of a shaft member Ax inserted into the core member Rc. The roll paper P1 is an example of a sheet medium, and the roll body R is an example of a sheet body.

The TOF (time of flight) sensor 104 includes a light source and a photodetector (not shown), and measures a distance to an object by measuring a time it takes for light emitted from the light source to be reflected by the object and then return to the photodetector. The TOF sensor 104 is disposed in a concave portion 103*a* formed on a wall portion of the paper support 103 facing the roll body R, and detects a distance to the roll body R. The TOF sensor 104 is disposed at a position between the pair of support members 110 in an axial direction of the roll body R such that an emitting direction of the light is directed toward the core member Rc of the roll body R.

The conveyor 105 conveys the roll paper P1 unwound from the roll body R accommodated in the paper support 103. The conveyor 105 is, for example, a platen roller disposed facing the printing device 106. Note that the conveyor 105 may include a roller or the like other than the platen roller.

The printing device 106 prints on the roll paper P1 conveyed by the conveyor 105. The printing device 106 is, for example, a print head disposed facing the platen roller.

The cutting device 107 is disposed downstream of the conveyor 105 and the printing device 106 in a conveying direction of the roll paper P1. The cutting device 107 cuts the roll paper P1 printed by the printing device 106 with a cutter.

A movable plate 111 (shutter) is provided on the paper support 103 so as to cover the concave portion 103*a* in which the TOF sensor 104 is disposed. The movable plate 111 is formed with an opening 111*a*. As shown in FIGS. 1 and 2, the movable plate 111 slides and a position thereof relative to the TOF sensor 104 changes interlocked with the opening or closing of the opening and closing cover 102. As shown in FIG. 1, when the opening and closing cover 102 is closed, the movable plate 111 slides downward and the opening 111*a* is positioned between the TOF sensor 104 and the roll body R. In this way, the TOF sensor 104 can detect the distance to the roll body R. On the other hand, as shown in FIG. 2, when the opening and closing cover 102 is opened, the movable plate 111 slides upward, and the opening 111*a* moves above the TOF sensor 104, and portions of the movable plate 111 other than the opening 111*a* are interposed between the TOF sensor 104 and the roll body R. In this way, the TOF sensor 104 can detect the distance to the movable plate 111. The distance from the TOF sensor 104 to the movable plate 111 is stored in advance as a predetermined value in a storage device 114 (see FIG. 5, which will be described later). A controller 117 (see FIG. 5, which will be described later) executes calibration for correcting distance detection deviation of the TOF sensor 104 based on the detection result by the TOF sensor 104 when the opening and closing cover 102 is opened and the predetermined value stored in the storage device 114.

Note that the state in which the opening and closing cover 102 is opened from the close state shown in FIG. 2 is an example of a predetermined state. The movable plate 111 is an example of a detection object and also an example of a relative displacement member.

<Movable Configuration of Movable Plate>

Figure 3:
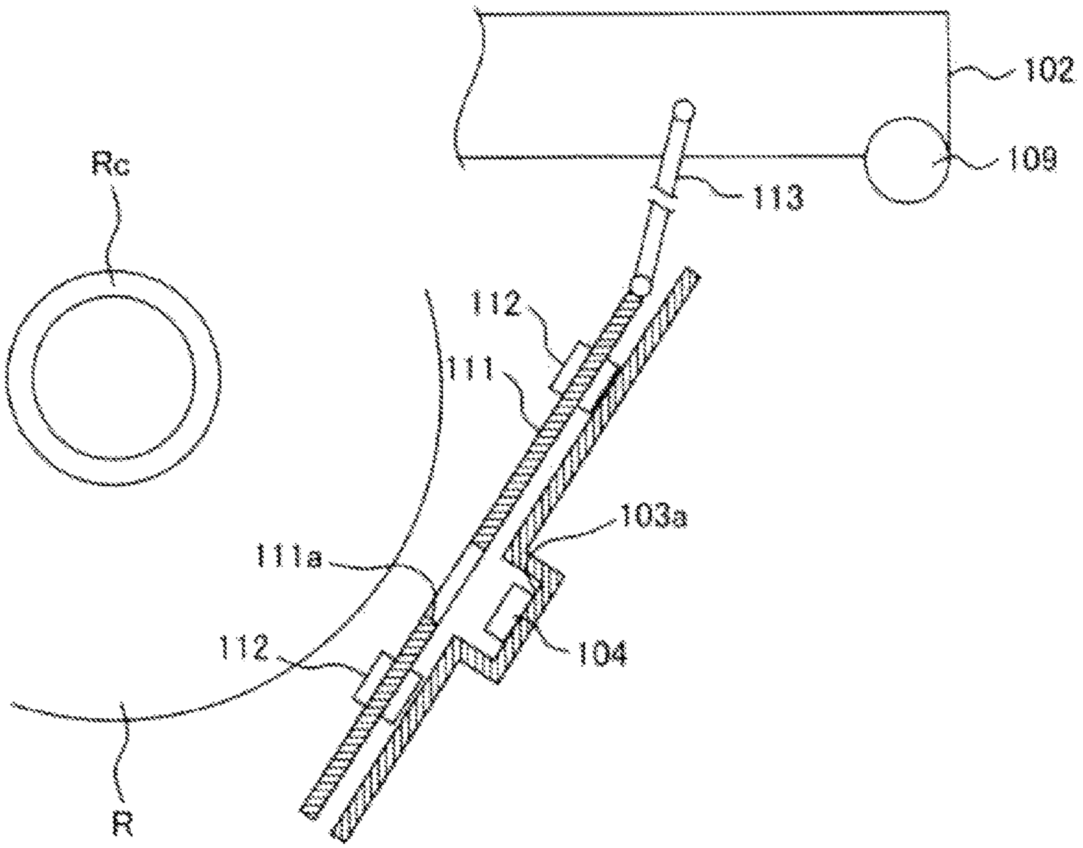
FIG. 3 is a partially enlarged cross-sectional view showing an example of a movable configuration of a movable plate with the opening and closing cover closed.
Figure 4:
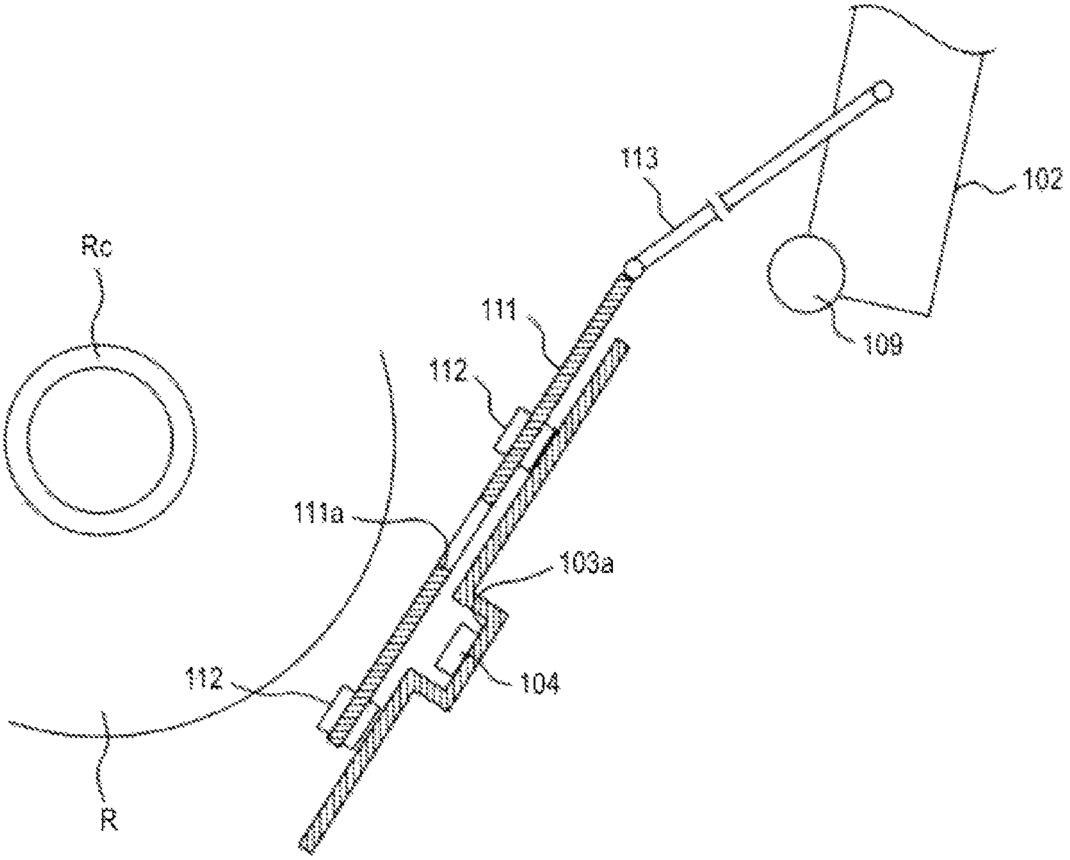
FIG. 4 is a partially enlarged cross-sectional view showing an example of the movable configuration of the movable plate with the opening and closing cover opened.

FIGS. 3 and 4 show an example of a movable configuration of the movable plate 111. FIG. 3 shows a state in which the opening and closing cover 102 is closed, and FIG. 4 shows a state in which the opening and closing cover 102 is opened.

As shown in FIGS. 3 and 4, the movable plate 111 is supported by, for example, a pair of guide members 112 in a way of being slidable substantially parallel to the wall portion of the paper support 103. One end of a link mechanism 113 is rotatably connected to an upper end portion of the movable plate 111, and the other end of the link mechanism 113 is rotatably connected to the opening and closing cover 102. The link mechanism 113 may be configured by one link member, or may be configured by coupling a plurality of link members. As shown in FIG. 3, when the opening and closing cover 102 is closed, the movable plate 111 slides downward by being pushed by the link mechanism 113, and the opening 111*a* is positioned between the TOF sensor 104 and the roll body R. In this way, the TOF sensor 104 can detect the distance to the roll body R. On the other hand, as shown in FIG. 4, when the opening and closing cover 102 is opened, the movable plate 111 slides upward by being pulled by the link mechanism 113, and the opening 111*a* moves above the TOF sensor 104, and portions of the movable plate 111 other than the opening 111*a* are interposed between the TOF sensor 104 and the roll body R. In other words, the concave portion 103*a* in which the TOF sensor 104 is disposed is covered by the movable plate 111. In this way, the TOF sensor 104 can detect the distance to the movable plate 111.

Note that a mechanism other than the link mechanism 113, such as a gear mechanism or a spring mechanism, may be adopted as long as the opening and closing of the opening and closing cover 102 and the sliding of the movable plate 111 can be interlocked with each other.

<Control Configuration of Printing Apparatus>

Figure 5:
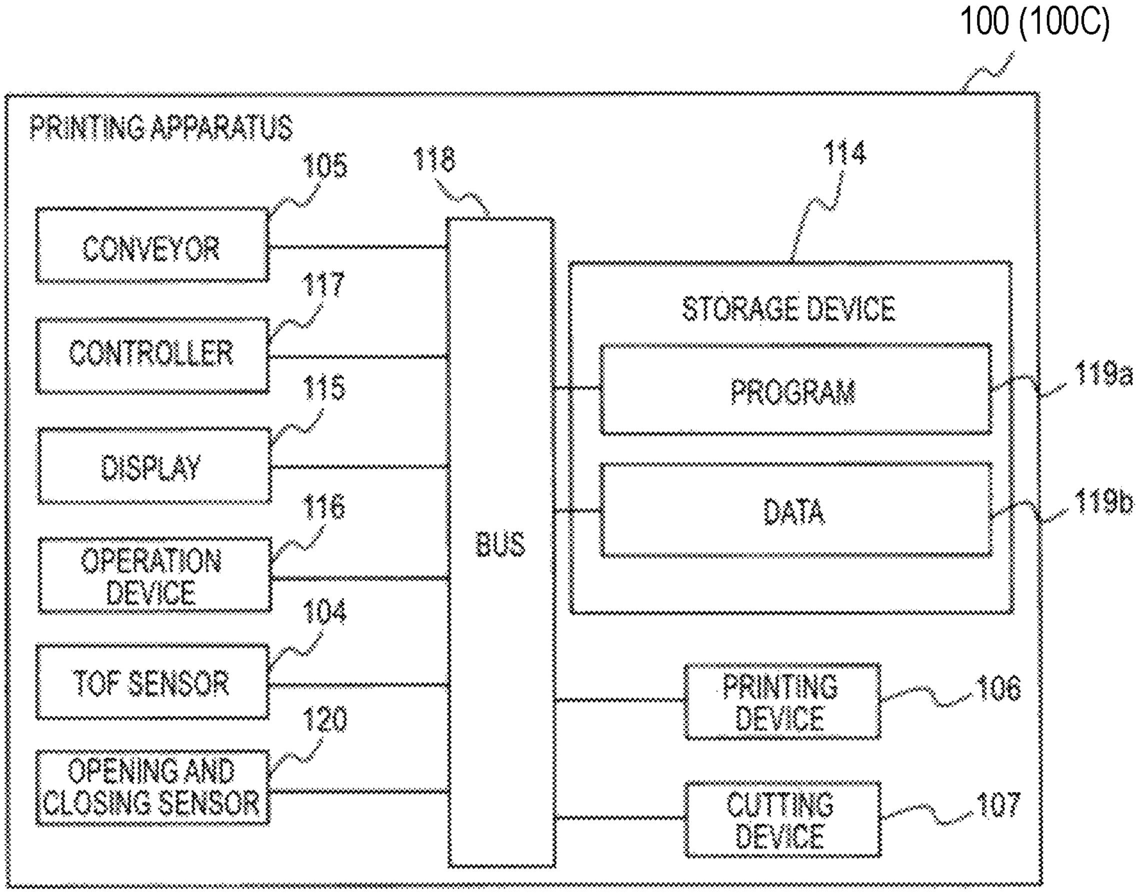
FIG. 5 is a block diagram showing an example of a control configuration of the printing apparatus according to the first embodiment of the present disclosure.

FIG. 5 shows an example of a control configuration of the printing apparatus 100.

As shown in FIG. 5, in addition to the above-described TOF sensor 104, conveyor 105, printing device 106, cutting device 107, and opening and closing sensor 120, the printing apparatus 100 includes the storage device 114, a display 115, an operation device 116, and the controller 117. The TOF sensor 104, conveyor 105, printing device 106, cutting device 107, opening and closing sensor 120, storage device 114, display 115, operation device 116, and controller 117 are connected to each other via a bus 118 so that information can be transmitted and received between each other.

Various programs 119*a* such as a printing program and calibration processing shown in a flow chart of FIG. 6, which will be described later, and various kinds of data 119*b* such as image data to be printed and a known distance from the TOF sensor 104 to the movable plate 111 are stored in the storage device 114.

The controller 117 is a device that performs data processing, and is, for example, a processor such as a CPU. The controller 117 executes various programs stored in the storage device 114. The programs 119*a* in the storage device 114 and the like and the controller 117 using these programs are an example of a controller.

The display 115 is, for example, a liquid crystal display, and can display various kinds of information. The operation device 116 is, for example, a keyboard or a button, and receives input operation by a user. The user can input various instructions to the printing apparatus 100 by operating the operation device 116.

<Control Contents of Controller>

Figure 6:
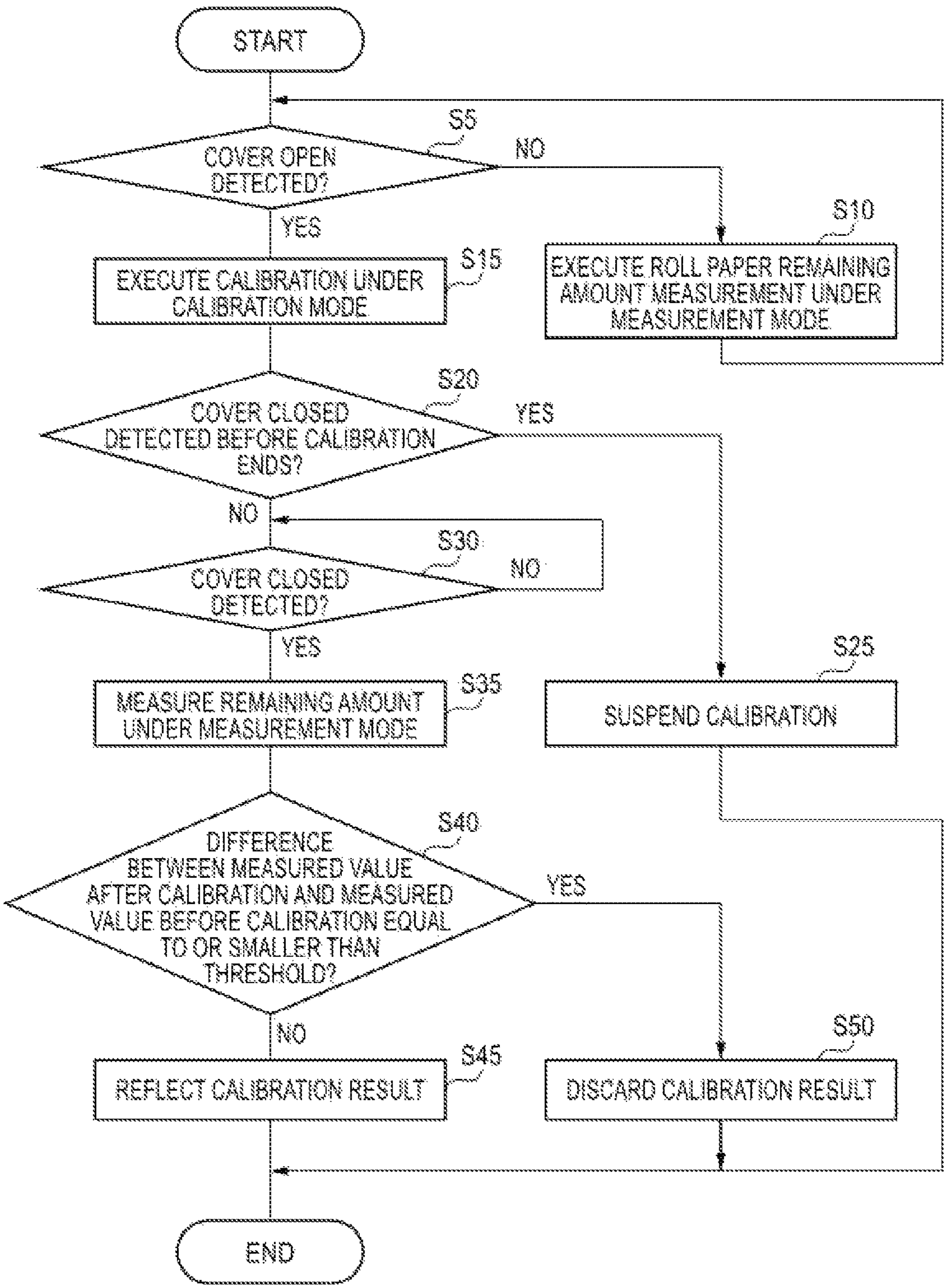
FIG. 6 is a flow chart showing an example of control contents executed by a controller of the printing apparatus according to the first embodiment of the present disclosure.

FIG. 6 shows an example of control contents executed by the controller 117 of the printing apparatus 100.

In a step S5, the controller 117 determines whether the opening and closing cover 102 is opened based on a detection result of the opening and closing sensor 120. If it is detected that the opening and closing cover 102 is closed (step S5: No), the controller 117 proceeds to a step S10.

In the step S10, the controller 117 sets a processing mode to a "measurement mode", and measures the remaining amount of the roll paper P1 in the roll body R in the paper support 103 based on a detection result of the distance to the roll body R by the TOF sensor 104. The step S10 is an example of remaining amount detection processing. Then, the controller 117 returns to the step S5.

On the other hand, in the step S5, if it is detected that the opening and closing cover 102 is opened (step S5: Yes), the controller 117 proceeds to a step S15.

In the step S15, the controller 117 sets the processing mode to a "calibration" mode, and execute calibration for correcting the distance detection deviation of the TOF sensor 104 based on a detection result of the distance to the movable plate 111 by the TOF sensor 104 when the opening and closing cover 102 is opened from a close state, and the predetermined value of the distance read from the storage device 114. The step S15 is an example of the calibration processing.

In a step S20, the controller 117 determines whether the opening and closing cover 102 is closed before the calibration ends, based on a detection result of the opening and closing sensor 120. If it is detected that the opening and closing cover 102 is closed before the calibration ends (step S20: Yes), the controller 117 proceeds to a step S25.

In the step S25, the controller 117 suspends the calibration. Then, this flow chart ends.

On the other hand, in the step S20, if it is not detected that the opening and closing cover 102 is closed before the calibration ends, in other words, the calibration ends with the opening and closing cover 102 opened (step S20: No), the controller 117 proceeds to a step S30.

In the step S30, the controller 117 determines whether the opening and closing cover 102 is closed based on a detection result of the opening and closing sensor 120. The controller 117 waits in the step S30 until the opening and closing cover 102 is closed (step S30: No), and if it is detected that the opening and closing cover 102 is closed (step S30: Yes), the controller 117 proceeds to a step S35.

In the step S35, the controller 117 sets the processing mode to the "measurement mode", and measures the remaining amount of the roll paper P1 in the roll body R in the paper support 103 based on a detection result of the distance to the roll body R by the TOF sensor 104. The measurement of the remaining amount may be performed only once, or may be performed a plurality of times.

In a step S40, the controller 117 compares the measured value of the remaining amount of the roll paper P1 immediately before executing the calibration in the step S15 and the measured value of the remaining amount of the roll paper P1 in the step S35 after executing the calibration, and then determines whether a difference therebetween is equal to or less than a predetermined threshold. If the difference between the measured values of the remaining amount is greater than the threshold (step S40: No), the controller 117 proceeds to a step S45.

Note that in the step S40, instead of comparing the measured values of the remaining amount before and after the calibration, distance values to the roll body R detected by the TOF sensor 104 before and after the calibration may be compared. In this case, the distance value detected before the calibration is an example of a first distance, the distance value detected after the calibration is an example of a second distance, and the step S40 is an example of distance comparison processing.

In the step S45, the controller 117 reflects a result of the calibration executed in the step S15 to correct the distance detection deviation of the TOF sensor 104. Then, this flow chart ends.

On the other hand, in the step S40, if the difference between the measured values of the remaining amount is equal to or less than the threshold (step S40: Yes), the controller 117 proceeds to a step S50.

In the step S50, the controller 117 discards the result of the calibration executed in the step S15 and does not correct the distance detection deviation of the TOF sensor 104. That is, when the difference between the measured values of the remaining amount is equal to or less than the threshold, for example, it is assumed that after the roll body R is taken out from the paper support 103 by the user, the same roll body R is set again in the paper support 103, that is, so-called resetting is performed, or merely the opening and closing cover 102 is opened and closed. In this case, if correction by the calibration is performed, detected distances before and after the resetting may vary, even if the roll body R is the same as before. By not performing correction by the calibration in the step S50, it is possible to prevent the occurrence of variations in the detected distance. Then, this flow chart ends.

Note that the steps S45 and S50 are an example of reflection determination processing.

In the printing apparatus 100 of the present embodiment, the conveyor 105 conveys the roll paper P1 provided in the roll body R accommodated in the paper support 103, and the printing device 106 prints on the conveyed roll paper P1. Based on the detection result of the distance to the roll body R by the TOF sensor 104, the remaining amount of the roll paper P1 is detected by the remaining amount detection processing in the step S10 executed by the controller 117.

In the present embodiment, the calibration processing in the step S15 is executed by the controller 117 when the opening and closing cover 102 is opened from the close state. When the opening and closing cover 102 is opened, the detection object by the TOF sensor 104 is the movable plate 111, and the detected distance is a predetermined value. In the calibration processing, the TOF sensor 104 detects the distance to the movable plate 111 when the opening and closing cover 102 is opened, and the distance detection deviation is corrected so that a value of the detected distance becomes the predetermined value.

In this way, since the distance detection deviation of the TOF sensor 104 is corrected by executing the calibration processing, it is possible to optically and accurately detect the distance to the roll body R, which is an object to be detected. As a result, the remaining amount of roll paper P1 can be detected with high accuracy.

In the present embodiment, the state in which the controller 117 executes the calibration processing in the step S15 is particularly a state in which the opening and closing cover 102 that opens and closes the opening of the housing 101 is opened from the close state. As a result, when the user opens the opening and closing cover 102, the calibration processing is executed interlocked with the opening, and therefore, operation for instructing the execution of the calibration becomes unnecessary, and the distance detection deviation of the TOF sensor 104 can be corrected in accordance with usage environment of the user without bothering the user. When the user replaces the roll body R, the distance detection deviation of the TOF sensor 104 can be reliably corrected.

In the present embodiment, the detection object subjected to the distance detection by the TOF sensor 104 in the calibration processing in the step S15 is particularly the movable plate 111. As a result, a relative position between the movable plate 111 and the TOF sensor 104 changes interlocked with the opening of the opening and closing cover 102, and after the change, the distance between the movable plate 111 and the TOF sensor 104 becomes the known distance, and therefore the distance detection deviation of the TOF sensor 104 can be corrected. When the opening and closing cover 102 is opened, the opening 111*a*, which is positioned in front of the TOF sensor 104 until then, moves to close the front of the TOF sensor 104, so that when the opening and closing cover 102 is open, the TOF sensor 104 can be prevented from being touched by a finger of the user or being stained, and the sensor can be protected.

In the present embodiment, particularly, for example, after the roll body R is taken out from the paper support 103 by the user, the same roll body R may be set again in the paper support 103, that is, so-called re-setting may be performed. In this case, due to the correction by the calibration processing performed after setting the roll body R, the detected distances before and after the resetting may vary, even if the roll body R is the same as before. In the present embodiment, in the step S40, the measured values of the remaining amount of the roll paper P1 measured before and after the execution of the calibration processing are compared with each other, and depending on the comparison result, it is determined whether to reflect the correction of the calibration processing in the steps S45 and S50. As a result, when the roll body R is reset, the correction by the calibration processing is not reflected, so that it is possible to prevent variations in the distance detected by the TOF sensor 104 from occurring.

Note that the above-described first embodiment is not limited to the contents described above, and various modifications are possible without departing from the gist and technical idea of the first embodiment.

Figure 7:
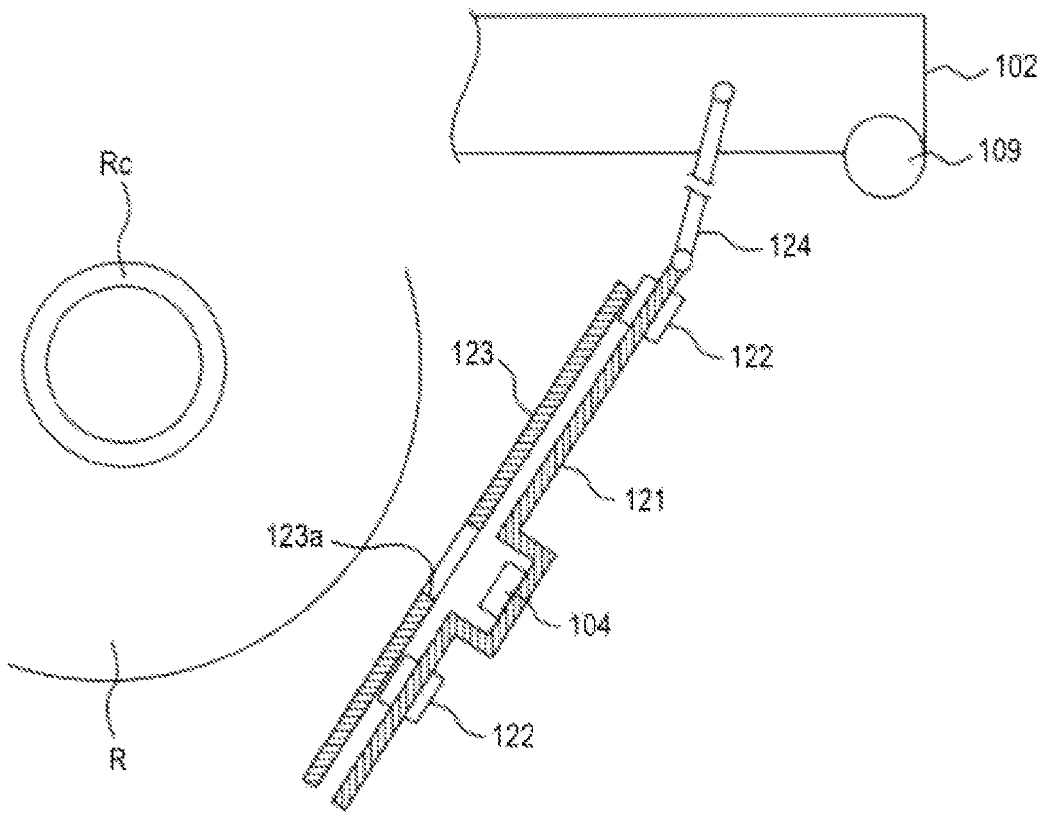
FIG. 7 is a partially enlarged cross-sectional view showing an example of a movable configuration of a TOF sensor with the opening and closing cover closed in a modification of the first embodiment.
Figure 8:
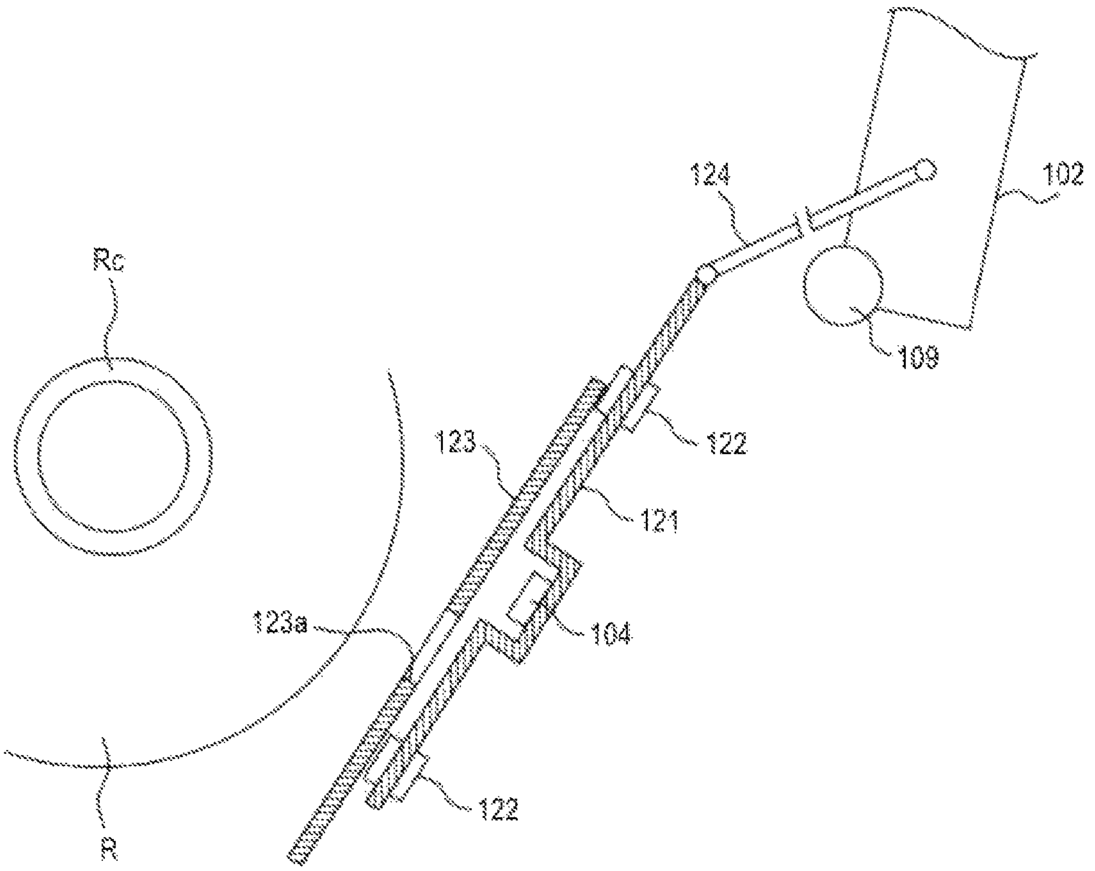
FIG. 8 is a partially enlarged cross-sectional view showing an example of the movable configuration of the TOF sensor with the opening and closing cover opened in the modification of the first embodiment.

For example, in the first embodiment, the movable plate 111 is configured to slide interlocked with the opening and closing of the opening and closing cover 102, but the present disclosure is not limited thereto, and the TOF sensor 104 may be moved. FIGS. 7 and 8 show an example of a movable configuration of the TOF sensor 104. FIG. 7 shows a state in which the opening and closing cover 102 is closed, and FIG. 8 shows a state in which the opening and closing cover 102 is opened.

As shown in FIGS. 7 and 8, a sensor support member 121 on which the TOF sensor 104 is disposed is supported by, for example, a pair of guide members 122 in a way of being slidable substantially parallel to the wall portion of the paper support 103. A fixed plate 123 (shutter) formed with an opening 123*a* is disposed on the sensor support member 121 on the roll body R side. One end of a link mechanism 124 is rotatably connected to an upper end portion of the sensor support member 121, and the other end of the link mechanism 124 is rotatably connected to the opening and closing cover 102. The link mechanism 124 may be configured by one link member, or may be configured by coupling a plurality of link members. As shown in FIG. 7, when the opening and closing cover 102 is closed, the sensor support member 121 slides downward by being pushed by the link mechanism 124, and the opening 123*a* of the fixed plate 123 is positioned between the TOF sensor 104 and the roll body R. In this way, the TOF sensor 104 can detect the distance to the roll body R. On the other hand, as shown in FIG. 8, when the opening and closing cover 102 is opened, the sensor support member 121 slides upward by being pulled by the link mechanism 124, and the opening 123*a* of the fixed plate 123 moves downward relatively to the TOF sensor 104, and portions of the fixed plate 123 other than the opening 123*a* are interposed between the TOF sensor 104 and the roll body R. In this way, the TOF sensor 104 can detect the distance to the fixed plate 123. By storing the distance from the TOF sensor 104 to the fixed plate 123 as a predetermined value in the storage device 114 in advance, the controller 117 can perform calibration for correcting the distance detection deviation of the TOF sensor 104. The fixed plate 123 is an example of the relative displacement member.

In the first embodiment, the calibration processing is executed interlocked with the opening of the opening and closing cover 102, but it is not always necessary to interlock the timing of executing the calibration processing with the opening or closing of the opening and closing cover 102. For example, the open state or close state of the opening and closing cover 102 may be detected at a predetermined time interval regardless of the opening or closing of the opening and closing cover 102, and the calibration processing may be executed when the open state is detected.

In the first embodiment, the case where the roll paper P1 is drawn out from the upper portion of the roll body R is explained, but a case where the roll paper P1 is drawn out from a lower portion of the roll body R can also be applied.

A second embodiment of the present disclosure will be described. In the second embodiment, in printing apparatus in which a roll body is rotatably supported by a roller in a paper support, which is so-called drop-in type printing apparatus, a TOF sensor is calibrated with an opening and closing cover opened.

<Overall Configuration of Printing Apparatus>

Figure 9:
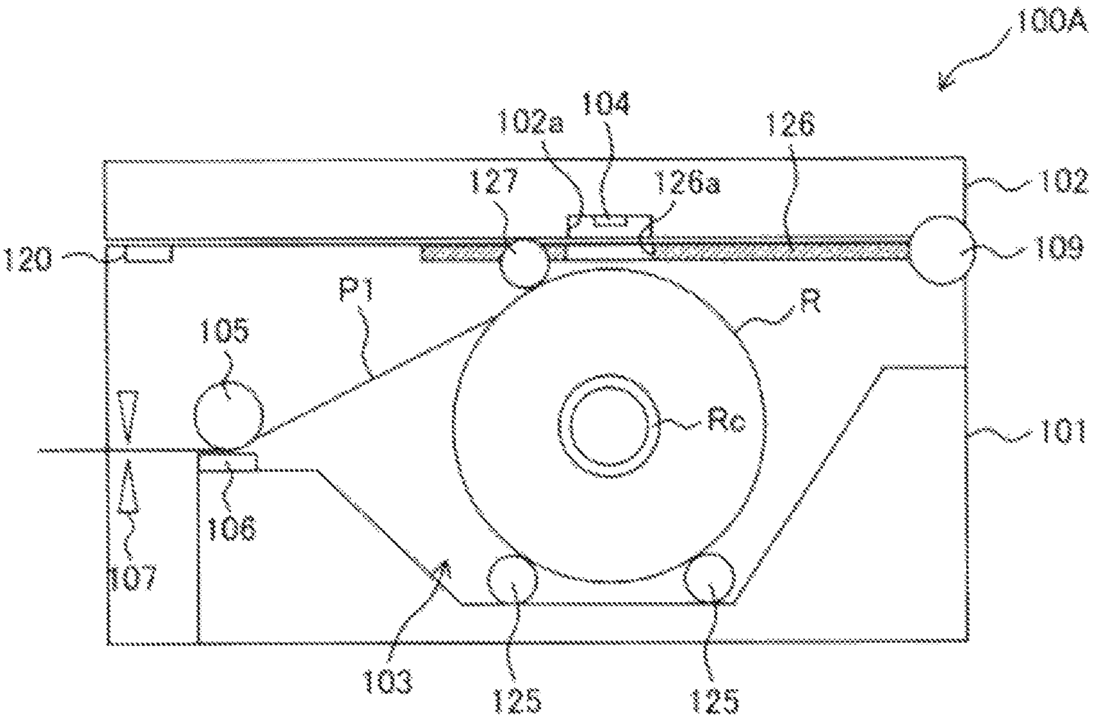
FIG. 9 is a side cross-sectional view showing an example of an overall configuration of printing apparatus according to a second embodiment of the present disclosure with the opening and closing cover closed.
Figure 10:
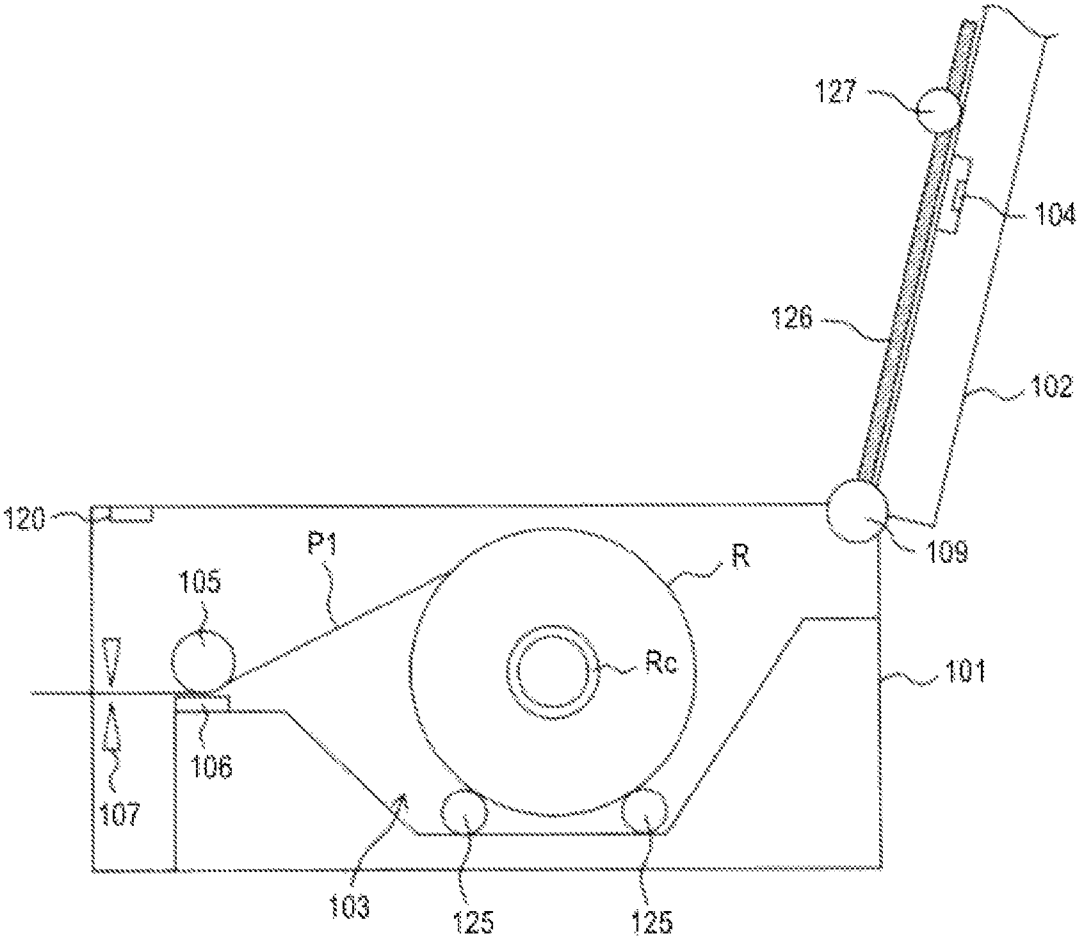
FIG. 10 is a side cross-sectional view showing an example of the overall configuration of the printing apparatus according to the second embodiment of the present disclosure with the opening and closing cover opened.

FIGS. 9 and 10 show an example of an overall configuration of printing apparatus 100A according to the second embodiment. FIG. 9 shows a state in which the opening and closing cover is closed, and FIG. 10 shows a state in which the opening and closing cover is opened.

As shown in FIGS. 9 and 10, the printing apparatus 100A includes a plurality of rollers 125 rotatably provided on a bottom portion of the paper support 103. The rollers 125 rotatably support the roll body R. Although the number of the rollers 125 is two in the example shown in FIGS. 9 and 10, the number may be three or more.

The printing apparatus 100A includes a pressing member 126. The pressing member 126 is a plate-like member having a predetermined size in the axial direction of the roll body R, and is rotatably connected to the housing 101 around the shaft 109, for example. As shown in FIG. 10, when the opening and closing cover 102 is open, the pressing member 126 is locked to the opening and closing cover 102 by a locking member (not shown), and is rotated together with the opening and closing cover 102 while maintaining a predetermined distance from the opening and closing cover 102. On the other hand, as shown in FIG. 9, when the opening and closing cover 102 is closed, the pressing member 126 is released from the locking to the opening and closing cover 102, and a pressing roller 127 is brought into contact with an upper portion of the roll body R by its own weight for example. The pressing member 126 rotates around the shaft 109 as a diameter of the roll body R decreases from a state in which the roll body R is brand new and has the maximum diameter until the roll body R becomes the minimum diameter after the roll paper P1 is used up. The pressing roller 127 is rotatably provided on the pressing member 126, and prevents the roll paper P1 from unraveling by being in contact with the roll body R from above. The number of the pressing roller 127 may be one, or a plurality of the pressing rollers 127 may be provided at a plurality of positions on the roll body R in the axial direction.

The TOF sensor 104 is disposed in a concave portion 102*a* formed on the opening and closing cover 102 facing the roll body R, and detects the distance to the roll body R. The TOF sensor 104 is disposed so that the emitting direction of the light faces the core member Rc of the roll body R.

An opening 126*a* is formed on the pressing member 126, and the opening 126*a* is configured to be openable and closable. As shown in FIG. 9, when the opening and closing cover 102 is closed, the opening 126*a* is open and positioned between the TOF sensor 104 and the roll body R. As a result, the TOF sensor 104 can detect the distance to the roll body R from a state in which the roll body R is brand new and has the maximum diameter until the roll body R becomes the minimum diameter after the roll paper P1 is used up.

On the other hand, as shown in FIG. 10, when the opening and closing cover 102 is opened, the opening 126*a* of the pressing member 126 is blocked. In this way, the TOF sensor 104 can detect the distance to the pressing member 126. The distance from the TOF sensor 104 to the pressing member 126 is stored in advance in the storage device 114 as a predetermined value by locking the pressing member 126 to the opening and closing cover 102 with a predetermined distance as described above. The controller 117 executes calibration for correcting the distance detection deviation of the TOF sensor 104 based on the detection result by the TOF sensor 104 when the opening and closing cover 102 is opened and the predetermined value stored in the storage device 114.

Note that configurations of the printing apparatus 100A other than the above are the same as those of the printing apparatus 100 in the first embodiment, and therefore description thereof will be omitted. The state in which the opening and closing cover 102 is opened from the close state shown in FIG. 10 is an example of the predetermined state.

<Opening and Closing Configuration of Opening of Pressing Member>

Figure 11:
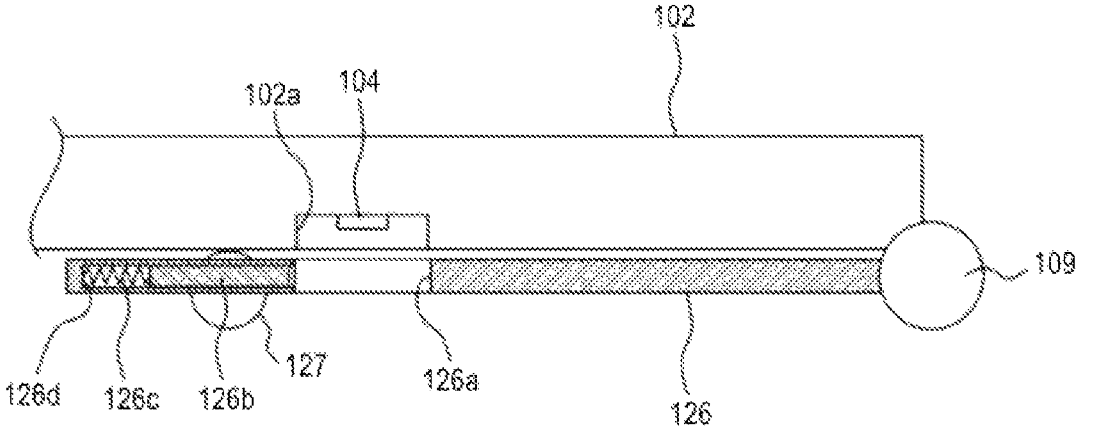
FIG. 11 is a partially enlarged cross-sectional view showing an example of an opening and closing configuration of an opening of a pressing member with the opening and closing cover closed.
Figure 12:
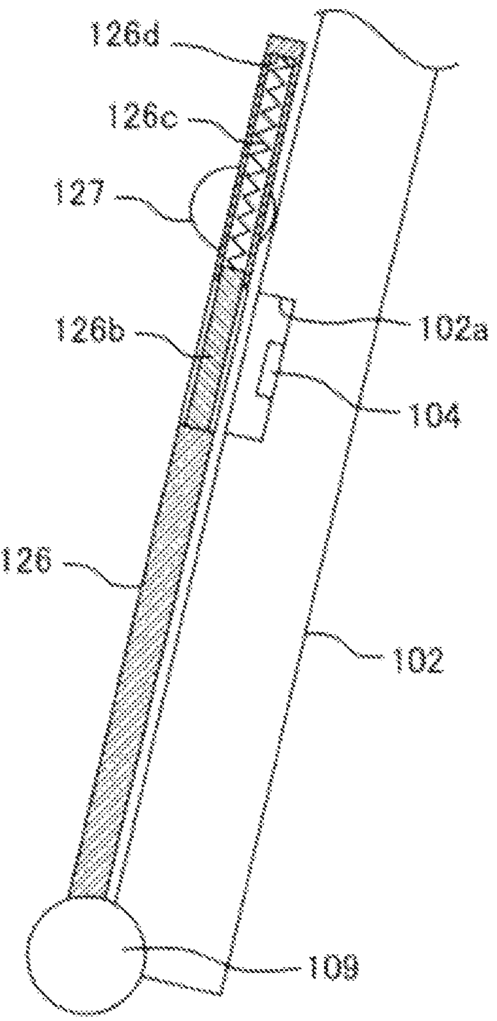
FIG. 12 is a partially enlarged cross-sectional view showing an example of the opening and closing configuration of the opening of the pressing member with the opening and closing cover opened.

FIGS. 11 and 12 show an example of an opening and closing configuration of the opening 126*a* of the pressing member 126. FIG. 11 shows a state in which the opening and closing cover 102 is closed, and FIG. 12 shows a state in which the opening and closing cover 102 is opened.

As shown in FIGS. 11 and 12, the pressing member 126 includes a blocking member 126*b* (shutter) and a spring 126*c*. The blocking member 126*b* is a plate-like member having an area capable of blocking the opening 126*a*. The spring 126*c* pulls the blocking member 126*b* with a predetermined force toward a distal end of the pressing member 126, that is, toward a side opposite to the shaft 109 with respect to the opening 126*a*. The blocking member 126*b* and the spring 126*c* are accommodated in an accommodation space 126*d* formed inside the pressing member 126 on a side opposite to the shaft 109 of the opening 126*a*. The accommodation space 126*d* communicates with the opening 126*a*.

As shown in FIG. 11, when the opening and closing cover 102 is closed, the blocking member 126*b* slides toward the distal end of the pressing member 126 by being pulled by the spring 126*c*, so that the opening 126*a* of the pressing member 126 is opened. In this way, the TOF sensor 104 can detect the distance to the roll body R. On the other hand, as shown in FIG. 12, when the opening and closing cover 102 is opened, the closing member 126*b* slides downward against a tensile force of the spring 126*c* by its own weight, so that the opening 126*a* is blocked. In this way, the TOF sensor 104 can detect the distance to the blocking member 126*b* of the pressing member 126.

Note that a mechanism other than the above mechanism, such as a link mechanism or a gear mechanism, may be adopted as long as the opening and closing of the opening and closing cover 102 and the opening and closing of the opening 126*a* of the pressing member 126 can be interlocked with each other.

A control configuration of the printing apparatus 100A according to the second embodiment and control contents by the controller 117 of the printing apparatus 100A are the same as those of the above-described first embodiment, and therefore description thereof will be omitted.

In the present embodiment, in the printing apparatus 100A in which the roll body R is dropped in, the TOF sensor 104 performs detection through the opening 126*a* of the pressing member 126, so that even when the remaining amount is relatively small, the pressing member 126 can prevent unraveling of the roll paper P1, and the remaining amount can be accurately detected.

Note that the above-described second embodiment is not limited to the contents described above, and various modifications are possible without departing from the gist and technical idea of the second embodiment.

For example, in the above-described second embodiment, although the case where the pressing member 126 is a plate-like member formed with the opening 126*a* is described, a configuration may be adopted in which the pressing roller 127 is rotatably held by a plurality of arm-shaped members, and the roll body R is pressed by the held pressing roller 127 to prevent unraveling. In this case, when the opening and closing cover 102 is closed, the TOF sensor 104 can detect the distance to the roll body R through a space between the plurality of arm-shaped members. A mechanism may be provided to block the space between the arm-shaped members when the opening and closing cover 102 is opened.

As described above, the case where the roll paper P1 is drawn out from the upper portion of the roll body R is explained, but a case where the roll paper P1 is drawn out from a lower portion of the roll body R can also be applied.

A third embodiment of the present disclosure will be described. The third embodiment is an embodiment in which calibration for the TOF sensor is performed with the opening and closing cover closed.

<Overall Configuration of Printing Apparatus>

Figure 13:
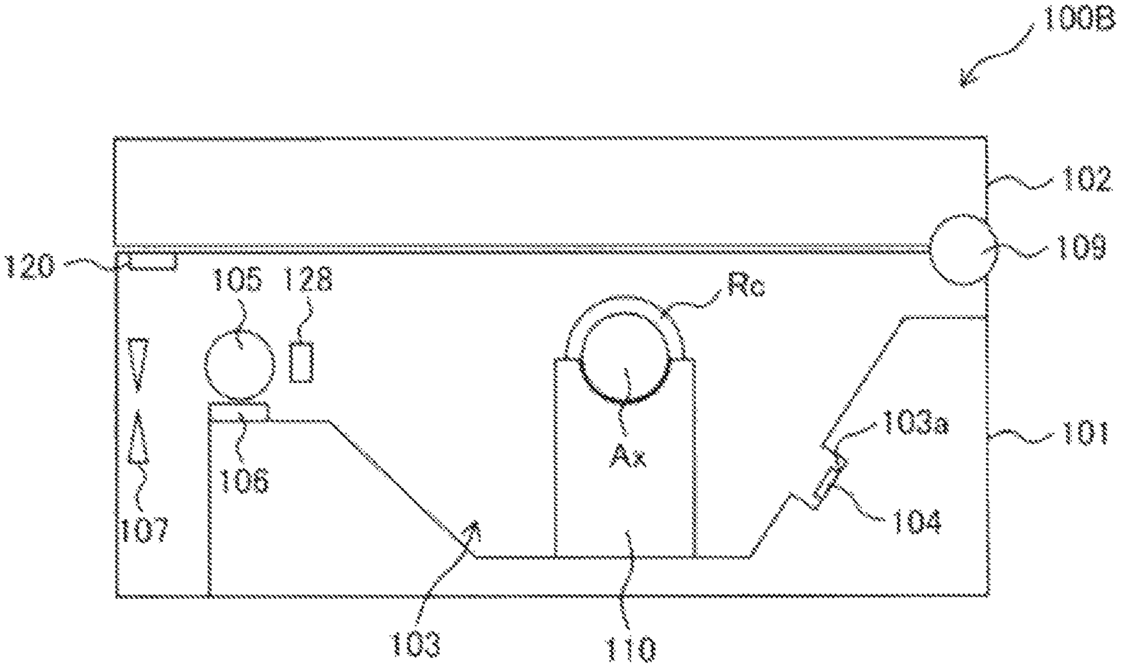
FIG. 13 is a side cross-sectional view showing an example of an overall configuration of printing apparatus according to a third embodiment of the present disclosure.

FIG. 13 shows an example of an overall configuration of printing apparatus 100B according to the third embodiment. As shown in FIG. 13, the printing apparatus 100B includes a paper sensor 128 that detects presence or absence of the roll paper P1 in a conveying path of the roll paper P1. When the paper sensor 128 detects that the roll paper P1 changes from being present in the conveying path to not being present with the opening and closing cover 102 closed, the controller 117 detects that the roll paper P1 of the roll body R is used up, that is, the roll body R becomes empty except for the core member Rc.

When the roll paper P1 of the roll body R is used up, the core member Rc is exposed. In this way, the TOF sensor 104 can detect the distance to the core member Rc positioned in the detection direction. Since an outer diameter of the core member Rc is determined by a standard of the roll body R for example, the distance from the TOF sensor 104 to the core member Rc is stored in advance in the storage device 114 as a predetermined value. The controller 117 executes calibration for correcting the distance detection deviation of the TOF sensor 104 based on the detection result by the TOF sensor 104 when the roll paper P1 of the roll body R is empty and the predetermined value stored in the storage device 114. Note that the core member Rc of the roll body R is an example of the detection object, and is also an example of a structural member of the sheet body.

Note that configurations other than the above, including the control configuration of the printing apparatus 100B, are the same as those of the printing apparatus 100 in the first embodiment, and therefore description thereof will be omitted. The state in which the opening and closing cover 102 is closed and the roll paper P1 of the roll body R is empty is an example of the predetermined state.

<Control Contents of Controller>

Figure 14:
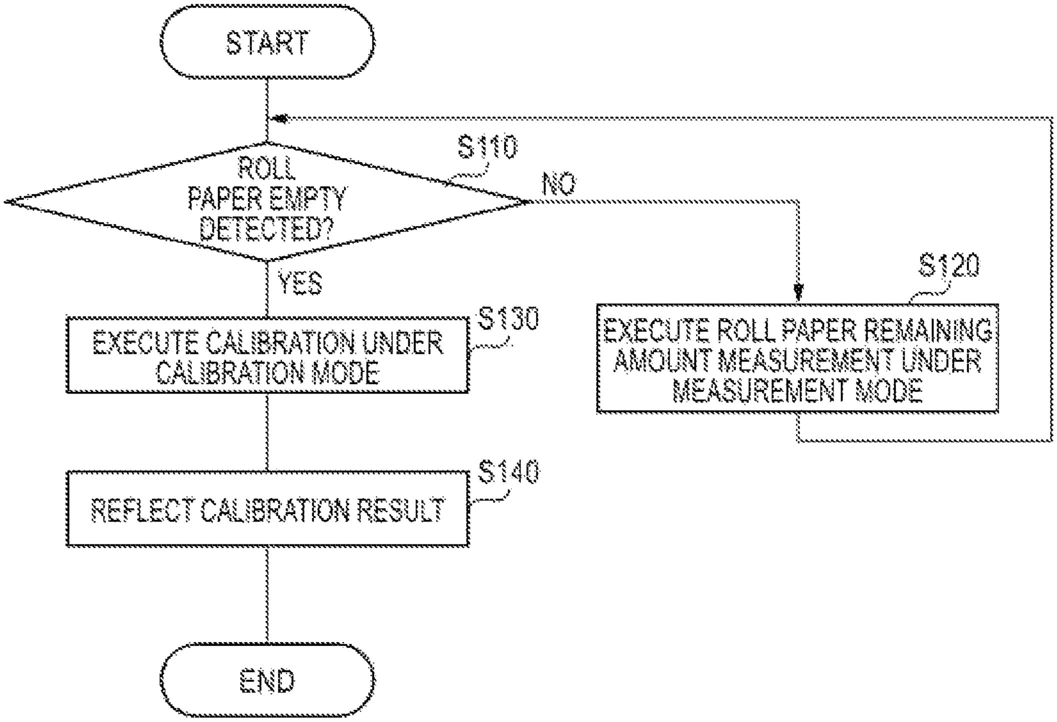
FIG. 14 is a flow chart showing an example of control contents executed by a controller of the printing apparatus according to the third embodiment of the present disclosure.

FIG. 14 shows an example of control contents executed by the controller 117 of the printing apparatus 100B. As shown in FIG. 14, in a step S110, the controller 117 determines whether the roll paper P1 of the roll body R is empty based on the detection result of the paper sensor 128. If it is detected that the roll paper P1 is not empty (step S110: No), the controller 117 proceeds to a step S120.

In the step S120, the controller 117 sets the processing mode to the "measurement mode", and measures the remaining amount of the roll paper P1 in the roll body R in the paper support 103 based on a detection result of the distance to the roll body R by the TOF sensor 104. The step S120 is an example of the remaining amount detection processing. Then, the controller 117 returns to the step S110.

On the other hand, in the step S110, if it is detected that the roll paper P1 is empty (step S110: Yes), the controller 117 proceeds to a step S130.

In the step S130, the controller 117 sets the processing mode to the "calibration" mode, and execute calibration for correcting the distance detection deviation of the TOF sensor 104 based on a detection result of the distance to the core member Rc by the TOF sensor 104 when the roll paper P1 of the roll body R is empty, and the predetermined value of the distance read from the storage device 114. The step S130 is an example of the calibration processing.

In a step S140, the controller 117 reflects a result of the calibration executed in the step S130 to correct the distance detection deviation of the TOF sensor 104. Then, this flow chart ends.

In the present embodiment, the detection object subjected to the distance detection by the TOF sensor 104 during the calibration processing is the core member Rc of the roll body R positioned in the detection direction of the TOF sensor 104 when the roll body R is used up. Generally, in the roll body R in which the roll paper P1 is wound in a roll shape, the sheet-shaped roll paper P1 is wound around an appropriate structural member such as the core member Rc. In this case, since an outer size of the core member Rc is generally known, when the roll paper Pb of the roll body R in the paper support 103 of the printing apparatus 100B is used up and the core member Rc is exposed, a distance from a portion of the core member Rc positioned in the detection direction of the TOF sensor 104 to the TOF sensor 104 is also known. According to the present embodiment, when the roll paper P1 of the roll body R is used up and the core member Rc is exposed, the core member Rc at the known distance is used as the detection object, so that the distance detection deviation of the TOF sensor 104 can be corrected. In the present embodiment, since calibration is performed when the remaining amount of roll paper P1 is zero, it is possible to improve detection accuracy of the remaining amount of roll paper P1 that is close to zero.

Note that the above-described third embodiment is not limited to the contents described above, and various modifications are possible without departing from the gist and technical idea of the third embodiment.

<Case of Executing Calibration when Replacing with New Roll Body>

For example, the calibration processing may be performed when the roll body R is replaced with a new one. A configuration of printing apparatus 100C according to the present modification is the same as that of the printing apparatus 100 according to the first embodiment described above, and therefore description thereof will be omitted.

When the opening and closing cover 102 is closed after the opening and closing cover 102 is opened, the controller

117 of the printing apparatus 100C determines whether the roll body R is replaced with a new one. The determination is made based on a detection result of the TOF sensor 104. For example, the controller 117 calculates a difference between a measured value of the remaining amount of the roll paper P1 before the opening and closing cover 102 is opened and a measured value of the remaining amount after the opening and closing cover 102 is closed, and determines that the roll body R is replaced with a new one when the difference is equal to or greater than a predetermined threshold. Note that a sensor other than the TOF sensor 104 may detect whether the roll body R is replaced with a new one.

The TOF sensor 104 detects a distance to the replaced new roll body R, that is, a distance to the roll paper P1 that is closest to the TOF sensor 104 included in the roll body R. In general, the new roll body R is, for example, a standard product and has a known external size, and therefore, when being disposed in the paper support 103 whose position is known in the printing apparatus 100C, for example, a distance from the roll paper P1 on the TOF sensor 104 side to the TOF sensor 104 is also known. The predetermined value is stored in the storage device 114 in advance. The controller 117 executes calibration for correcting the distance detection deviation of the TOF sensor 104 based on the detection result by the TOF sensor 104 when the roll body R is replaced with a new one and the predetermined value stored in the storage device 114.

Note that the roll paper P1 that is closest to the TOF sensor 104 included in the roll body R is an example of the detection object. The state in which the opening and closing cover 102 is closed from the open state and the roll body R is replaced with a new one is an example of the predetermined state.

Figure 15:
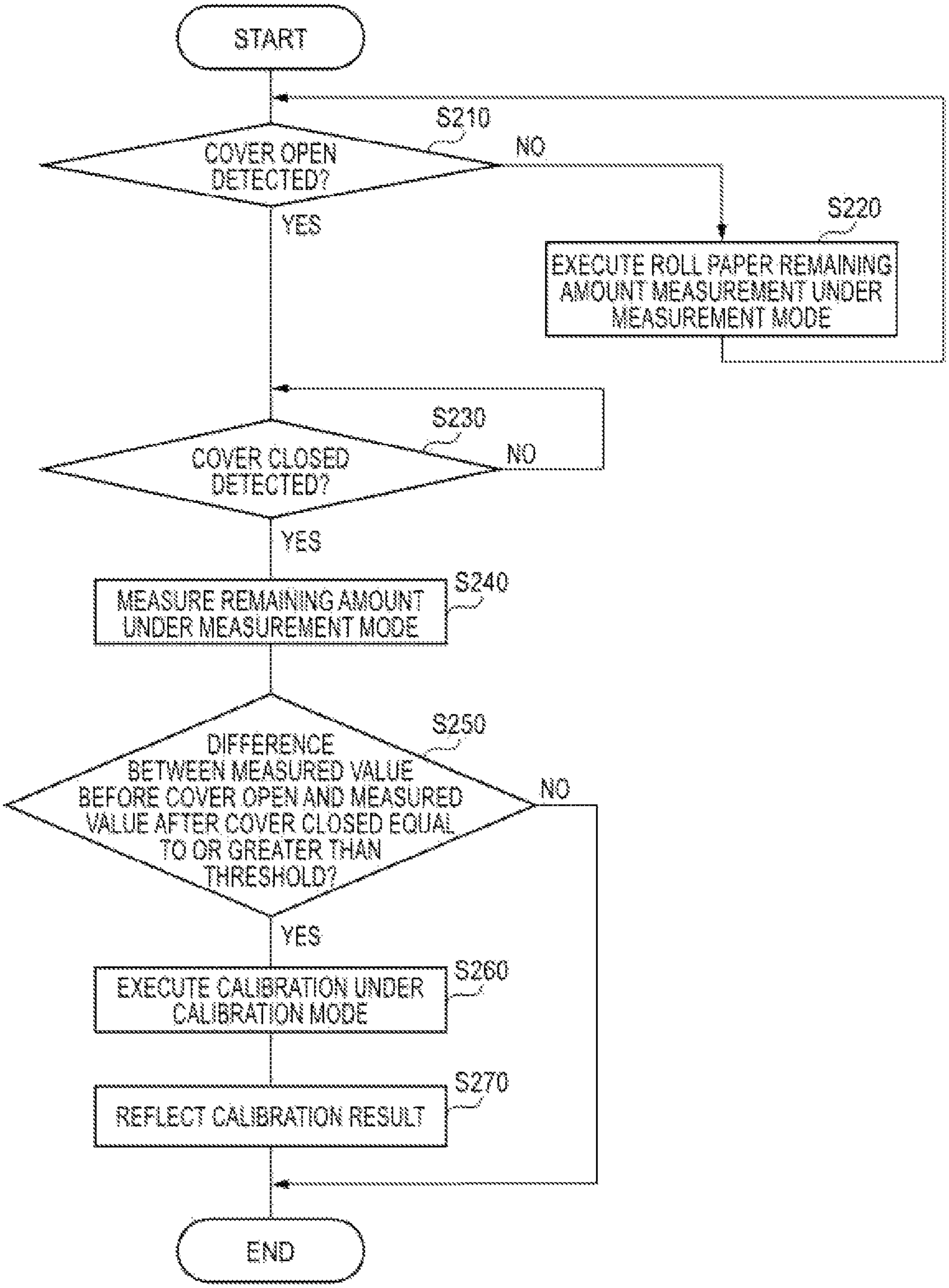
FIG. 15 is a flow chart showing an example of control contents executed by controller of printing apparatus in a modification of the third embodiment.

FIG. 15 shows an example of control contents executed by the controller 117 of the printing apparatus 100C. In FIG. 15, steps S210 and S220 are the same as the steps S5 and S10 in FIG. 6 described above, and therefore description thereof will be omitted.

In the step S210, if it is detected that the opening and closing cover 102 is opened (step S210: Yes), the controller 117 proceeds to a step S230.

In the step S230, the controller 117 determines whether the opening and closing cover 102 is closed based on a detection result of the opening and closing sensor 120. The controller 117 waits in the step S230 until the opening and closing cover 102 is closed (step S230: No), and if it is detected that the opening and closing cover 102 is closed (step S230: Yes), the controller 117 proceeds to a step S240.

In the step S240, the controller 117 sets the processing mode to the "measurement mode", and measures the remaining amount of the roll paper P1 in the roll body R in the paper support 103 based on a detection result of the distance to the roll body R by the TOF sensor 104. The measurement of the remaining amount may be performed only once, or may be performed a plurality of times.

In a step S250, the controller 117 compares the measured value of the remaining amount of the roll paper P1 immediately before the opening and closing cover 102 is opened in the step S210 and the measured value of the remaining amount of the roll paper P1 in the step S240 after the opening and closing cover 102 is closed from the open state, and then determines whether a difference therebetween is equal to or greater than a predetermined threshold. If the difference between the measured values of the remaining amount is smaller than the threshold (step S250: No), the controller 117 determines that the roll body R is not replaced with a new one, and ends this flow chart. On the other hand, if the difference between the measured values of the remaining amount is equal to or greater than the threshold (step S250: Yes), the controller 117 determines that the roll body R is replaced with a new one and proceeds to a step S260. The threshold is set to an appropriate value in advance so that the replacement with a new roll body R can be detected.

In the step S260, the controller 117 sets the processing mode to the "calibration" mode, and execute calibration for correcting the distance detection deviation of the TOF sensor 104 based on a detection result of the distance to the roll body R by the TOF sensor 104 when the roll body R is replaced with a new one, and the predetermined value of the distance read from the storage device 114. The step S260 is an example of the calibration processing.

In a step S270, the controller 117 reflects a result of the calibration executed in the step S260 to correct the distance detection deviation of the TOF sensor 104. Then, this flow chart ends.

In the modification described above, the detection object subjected to the distance detection by the TOF sensor 104 during the calibration processing is the roll paper P1 closest to the TOF sensor 104 when the roll body R is replaced with a new one. In general, the new roll body R is, for example, a standard product and has a known external size, and therefore, when being disposed in the paper support 103 whose position is known in the printing apparatus 100C, for example, a distance from the roll paper P1 on the TOF sensor 104 side to the TOF sensor 104 is also known. According to the present modification, when the roll body R is replaced with a new one, the roll paper P1 at the known distance is used as the detection object, so that the distance detection deviation of the TOF sensor 104 can be corrected.

Note that the technique of the above modification can also be applied to printing apparatus having a configuration in which the roll body R is replaced with a new one without opening or closing the opening and closing cover 102. For example, it corresponds to printing apparatus configured to be replaced with a new roll body R by inserting or removing a roll paper cassette into or from the housing 101, or the like. In this case, in the step S210, it is sufficient to determine whether an appropriate sensor detects that the roll paper cassette is removed from the housing 101, and determine whether the roll paper cassette is inserted into the housing 101 in the step S230. Then, in the step S250, it is sufficient to compare the measured value of the remaining amount of the roll paper P1 immediately before the roll paper cassette is removed in the step S210 with the measured value of the remaining amount of roll paper P1 after the roll paper cassette is inserted, and determines whether the difference is equal to or greater than a predetermined threshold.

<Case of Executing Calibration when Roll Body is not Accommodated>

For example, the calibration processing may be performed while the roll body R is not accommodated in the paper support 103.

Figure 16:
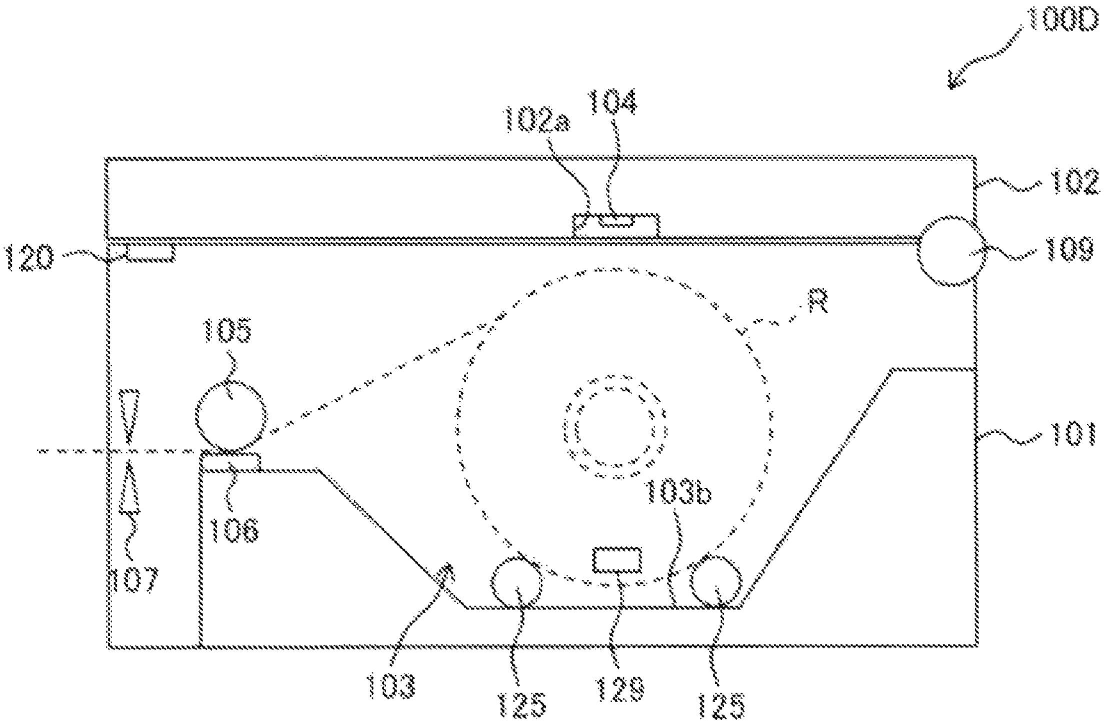
FIG. 16 is a side cross-sectional view showing an example of an overall configuration of the printing apparatus according to another modification of the third embodiment.

FIG. 16 shows an example of a configuration of printing apparatus 100D according to the present modification. As shown in FIG. 16, the printing apparatus 100D is drop-in type printing apparatus similar to the printing apparatus 100A of the second embodiment described above, and includes a plurality of rollers 125 that rotatably support the roll body R on a bottom portion 103*b* of the paper support 103. The TOF sensor 104 is disposed in the concave portion 102*a* formed on the opening and closing cover 102 facing the roll body R accommodated in the paper support 103. The TOF sensor 104 faces the bottom portion 103*b* of the accommodation portion 103 when the roll body R is not accommodated in the paper support 103.

A roll detection sensor 129 for detecting presence or absence of the roll body R is disposed in the paper support 103. The roll detection sensor 129 is provided at a lower portion of a side surface of the roll body R in the axial direction in the paper support 103. The roll detection sensor 129 may be a sensor that optically detects the presence or absence of the roll body R, or may be a sensor that performs the detection mechanically, magnetically, or by other methods. Other configurations of the printing apparatus 100D are the same as those of the printing apparatus 100A of the second embodiment described above, except that the pressing member 126 is not provided.

Note that the presence or absence of the roll body R in the paper support 103 may be detected based on a detection value of the TOF sensor 104 without providing the roll detection sensor 129. For example, when the detection value of the TOF sensor 104 with the opening and closing cover 102 closed is greater than a predetermined threshold, it may be determined that the roll body R is not accommodated in the paper support 103.

The controller 117 of the printing apparatus 100D determines whether the roll body R is accommodated in the paper support 103 based on a detection result of the roll detection sensor 129 when the opening and closing cover 102 is closed after the opening and closing cover 102 is opened. When the roll body R is not accommodated, the TOF sensor 104 can detect a distance to the bottom portion 103*b* of the paper support 103. The distance from the TOF sensor 104 to the bottom portion 103*b* is stored in advance in the storage device 114 as a predetermined value. The controller 117 executes calibration for correcting the distance detection deviation of the TOF sensor 104 based on the detection result by the TOF sensor 104 when the roll body R is not accommodated in the paper support 103 and the predetermined value stored in the storage device 114. In order to perform the above calibration, the controller 117 performs guidance display on the display 115 for prompting the user to remove the roll body R and close the opening and closing cover 102.

Note that the state in which the opening and closing cover 102 is closed from the open state and the roll body R is not accommodated in the paper support 103 is an example of the predetermined state. The bottom portion 103*b* is an example of a fixed structural member.

Note that the detection object of the TOF sensor 104 is not limited to the bottom portion 103*b* of the paper support 103. The detection object of the TOF sensor 104 may also be a wall surface or other members as long as it is a fixed structural member of the printing apparatus 100D, a distance to which can be detected by the TOF sensor 104 when the roll body R is not accommodated.

Figure 17:
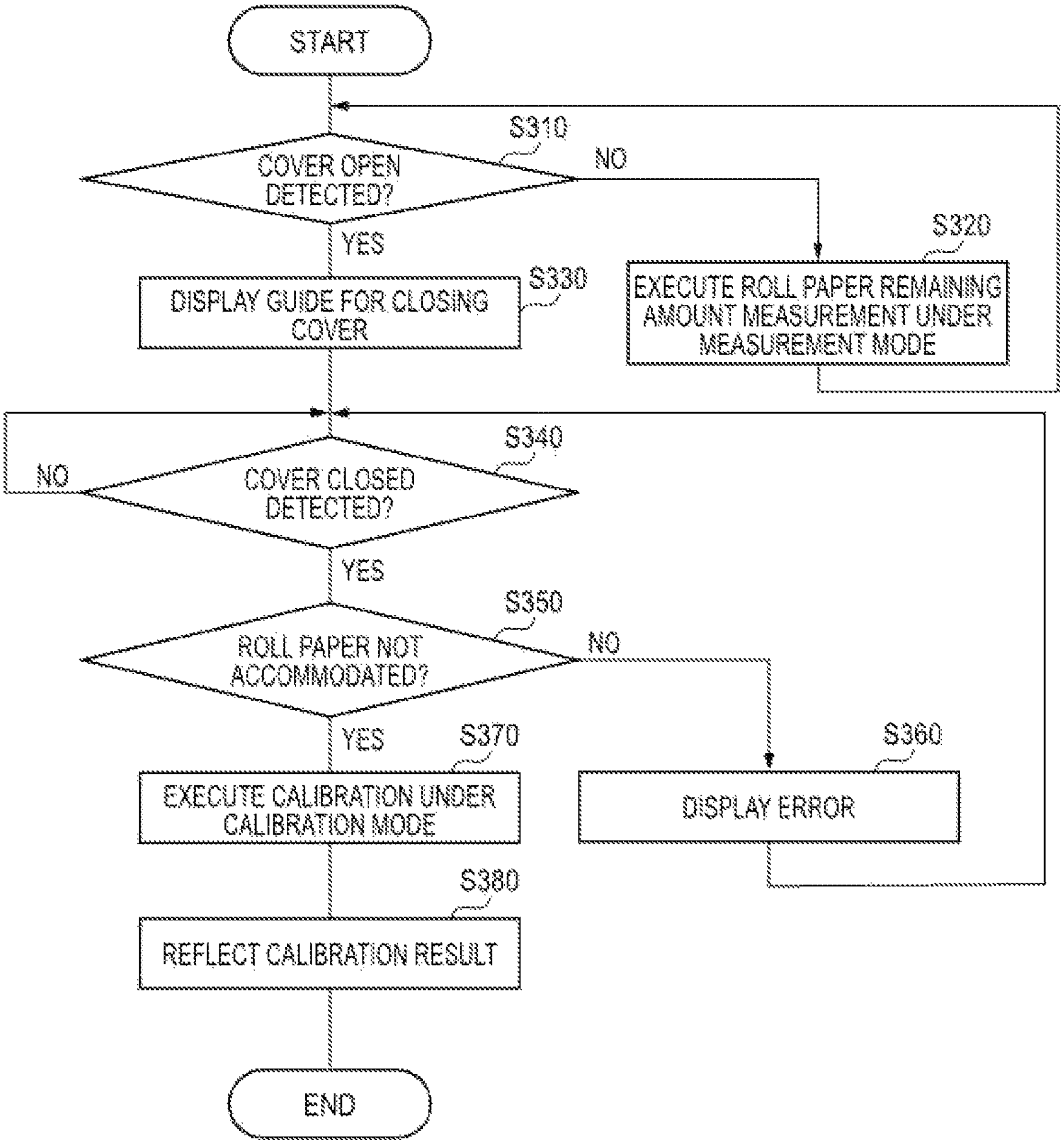
FIG. 17 is a flow chart showing an example of control contents executed by a controller of the printing apparatus in the another modification of the third embodiment.

FIG. 17 shows an example of control contents executed by the controller 117 of the printing apparatus 100D. In FIG. 17, steps S310 and S320 are the same as the steps S5 and S10 in FIG. 6 described above, and therefore description thereof will be omitted.

In the step S310, if it is detected that the opening and closing cover 102 is opened (step S310: Yes), the controller 117 proceeds to a step S330.

Figure 18:
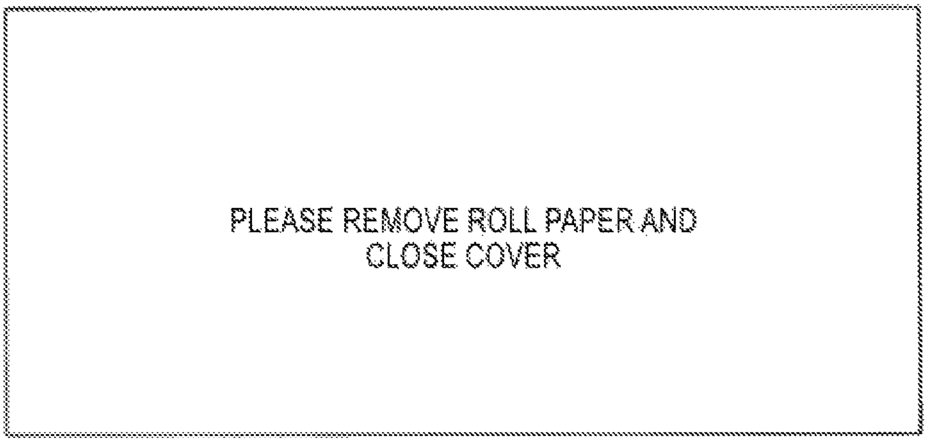
FIG. 18 is a diagram showing an example of guidance display displayed on a display in the another modification of the third embodiment.

In the step S330, the controller 117 performs the guidance display on the display 115 for prompting the user to remove the roll body R and close the opening and closing cover 102. FIG. 18 shows an example of the guidance display.

In the step S340, the controller 117 determines whether the opening and closing cover 102 is closed based on a detection result of the opening and closing sensor 120. The controller 117 waits in the step S340 until the opening and closing cover 102 is closed (step S340: No), and if it is detected that the opening and closing cover 102 is closed (step S340: Yes), the controller 117 proceeds to a step S350.

In the step S350, the controller 117 determines whether the roll body R is not accommodated in the paper support 103 based on the detection result of the roll detection sensor 129. If it is determined that the roll body R is accommodated in the paper support 103 (step S350: No), the controller 117 proceeds to a step S360.

Figure 19:
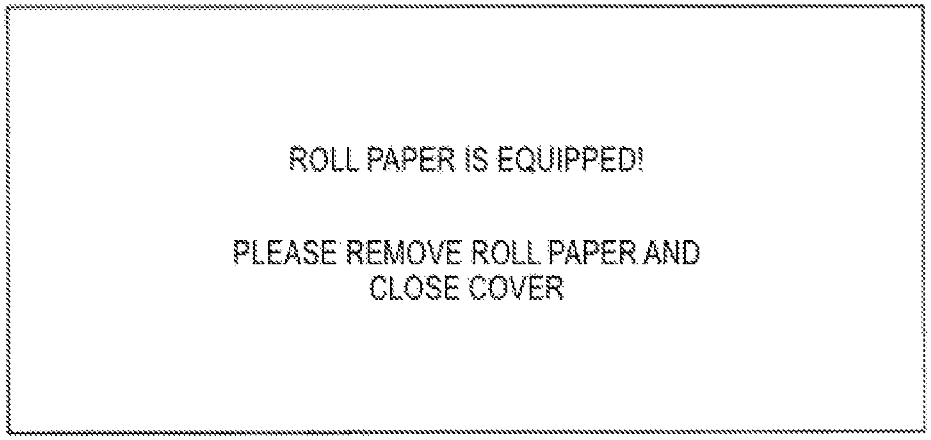
FIG. 19 is a diagram showing an example of error display displayed on the display in the another modification of the third embodiment.

In the step S360, the controller 117 performs error display on the display 115 for warning the user that the roll body R is equipped. FIG. 19 shows an example of the error display. In the example shown in FIG. 19, display is performed to warn the user that the roll body R is equipped, and to prompt the user to remove the roll body R and close the opening and closing cover 102 again. Then, the controller 117 returns to the step S340.

On the other hand, when the controller 117 determines in the step S350 that the roll body R is not accommodated in the paper support 103 (step S350: Yes), the controller 117 proceeds to a step S370.

In the step S370, the controller 117 sets the processing mode to the "calibration" mode, and execute calibration for correcting the distance detection deviation of the TOF sensor 104 based on a detection result of the distance to the bottom portion 103*b* by the TOF sensor 104 when the roll body R is not accommodated in the paper support 103, and the predetermined value of the distance read from the storage device 114. The step S370 is an example of the calibration processing.

In a step S380, the controller 117 reflects a result of the calibration executed in the step S370 to correct the distance detection deviation of the TOF sensor 104. Then, this flow chart ends.

In the modification described above, the detection object subjected to the distance detection by the TOF sensor 104 during the calibration processing is the bottom portion 103*b* of the paper support 103. As a result, the bottom portion 103*b* disposed at a predetermined position within the printing apparatus 100D and at a known distance from the TOF sensor 104 is used as the detection object, so that the distance detection deviation of the TOF sensor 104 can be corrected.

A fourth embodiment of the present disclosure will be described. The fourth embodiment is an embodiment in which printing apparatus prints on a cut paper.

<Overall Configuration of Printing Apparatus>

Figure 20:
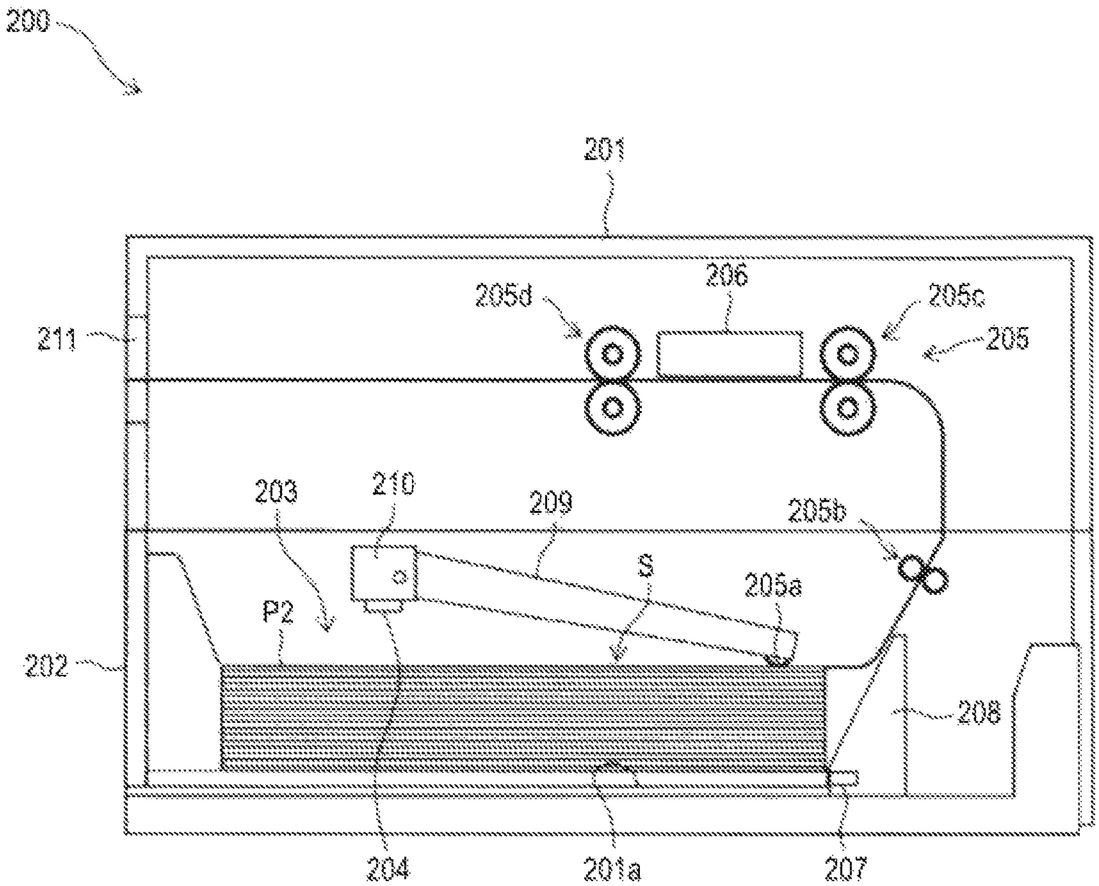
FIG. 20 is a side cross-sectional view showing an example of an overall configuration of printing apparatus according to a fourth embodiment of the present disclosure.

FIG. 20 shows an example of an overall configuration of printing apparatus 200 according to the fourth embodiment. As shown in FIG. 20, the printing apparatus 200 includes a housing 201, a tray 202, a paper support 203, a TOF sensor 204, a conveyor 205, a printing device 206, an attachment and detachment sensor 207, and a guide wall portion 208.

The housing 201 encloses the tray 202, the paper support 203, the TOF sensor 204, the conveyor 205, the printing device 206, the attachment and detachment sensor 207, the guide wall portion 208, and the like.

The tray 202 is attached to and detached from the housing 201 by being inserted into and removed from a lower portion of the housing 201. The attachment and detachment sensor 207 is disposed, for example, on the guide wall portion 208 and detects whether the tray 202 is inserted into the housing 201 or removed from the housing 201. The attachment and detachment sensor 207 may be a sensor that mechanically detects the attachment and detachment state of the tray 202, or may be a sensor that detects the attachment and detachment state optically, magnetically, or by other methods.

The paper support 203 is provided on the tray 202. The paper support 203 accommodates a sheet body S in which a plurality of cut papers P2 are stacked in a thickness direction. The cut paper P2 is an example of the sheet medium.

The TOF sensor 204 is provided over the tray 202 inserted into the housing 201 and faces the sheet body S. The TOF sensor 204 is provided, for example, on an arm support member 210 which will be described later and faces the sheet body S. The arm support member 210 rotatably supports a swing arm 209. The TOF sensor 204 detects a distance to the cut paper P2 closest to the TOF sensor 204 included in the sheet body S, that is, the uppermost cut paper P2. Note that the TOF sensor 204 may be disposed on a member other than the arm support member 210 as long as it is disposed facing the sheet body S.

The conveyor 205 conveys the cut paper P2 accommodated in the paper support 203. The conveyor 205 includes, for example, a feed roller 205*a*, an intermediate roller 205*b*, a conveyance roller 205*c*, a discharge roller 205*d*, and the like. The arm support member 210 rotatably supports the swing arm 209. The feed roller 205*a* is disposed near a tip of the swing arm 209. The feed roller 205*a* is driven by a motor to rotate, feeds out the cut paper P2 from the paper support 203 of the tray 202, and conveys the cut paper P2 along the guide wall portion 208. The intermediate roller 205*b* conveys the cut paper P2 conveyed by the feed roller 205*a* to the conveyance roller 205*c*. The conveyance roller 205*c* conveys the cut paper P2 conveyed by the intermediate roller 205*b* to the printing device 206. The discharge roller 205*d* conveys the cut paper P2 printed by the printing device 206 to a paper discharge port 211.

The printing device 206 prints on the cut paper P2 conveyed by the conveyance roller 205*c*. The printing device 206 is a print head disposed downstream in a conveying direction of the conveyance roller 205*c* and upstream in the conveying direction of the discharge roller 205*d*.

A controller 217 (see FIG. 21, which will be described later) of the printing apparatus 200 determines whether the tray 202 is removed from the housing 201 based on a detection result of the attachment and detachment sensor 207. When the tray 202 is removed from the housing 201, the TOF sensor 204 can detect a distance to an exposed bottom portion 201*a* of the housing 201. The distance from the TOF sensor 204 to the bottom portion 201*a* is stored in advance as a predetermined value in a storage device 214 (see FIG. 21, which will be described later). The controller 217 executes calibration for correcting distance detection deviation of the TOF sensor 204 based on a detection result by the TOF sensor 204 when the tray 202 is removed from the housing 201 and the predetermined value stored in the storage device 214. The bottom portion 201*a* is an example of the fixed structural member.

Note that a detection object of the TOF sensor 204 is not limited to the bottom portion 201*a* of the housing 201. The detection object of the TOF sensor 204 may also be a wall surface or other members as long as it is a fixed structural member of the printing apparatus 200, a distance to which can be detected by the TOF sensor 204 when the tray 202 is removed from the housing 201. The state in which the tray 202 is removed from the housing 201 is an example of the predetermined state.

<Control Configuration of Printing Apparatus>

Figure 21:
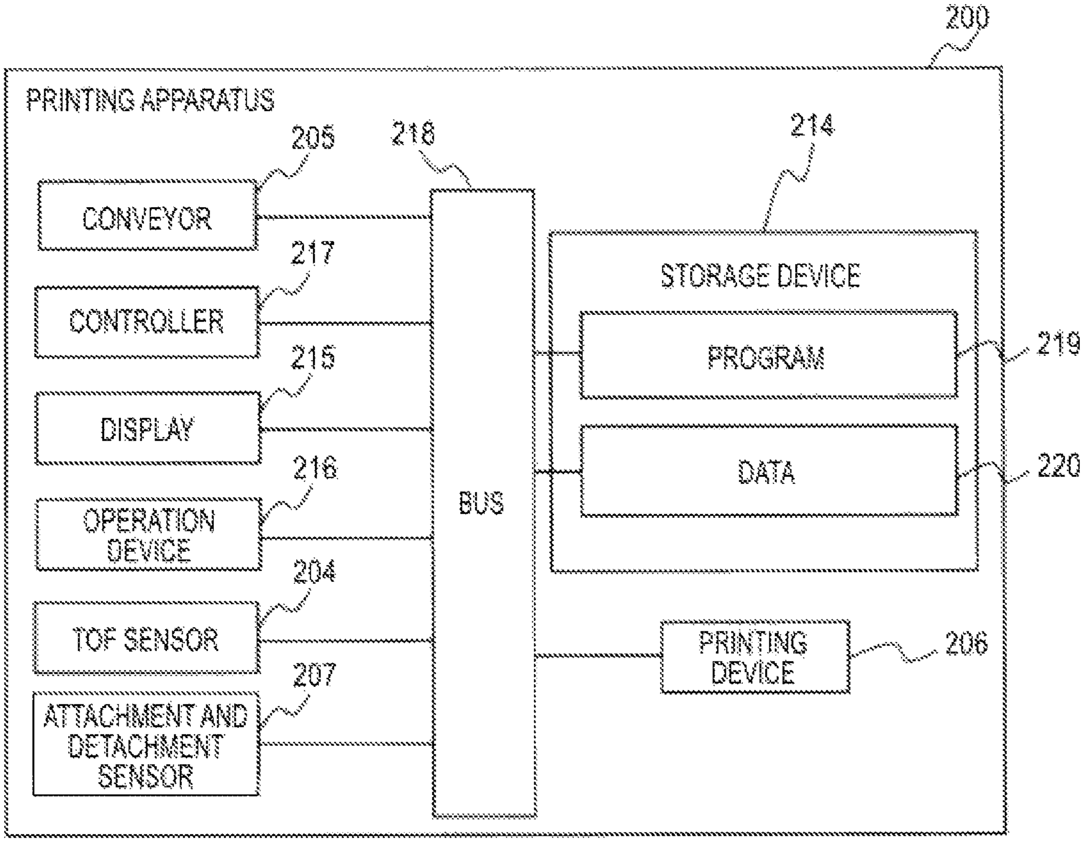
FIG. 21 is a block diagram showing an example of a control configuration of the printing apparatus according to the fourth embodiment of the present disclosure.

FIG. 21 shows an example of a control configuration of the printing apparatus 200.

As shown in FIG. 21, in addition to the above-described TOF sensor 204, conveyor 205, printing device 206, and the attachment and detachment sensor 207, the printing apparatus 200 includes the storage device 214, a display 215, an operation device 216, and the controller 217. The TOF sensor 204, conveyor 205, printing device 206, attachment and detachment sensor 207, storage device 214, display 215, operation device 216, and controller 217 are connected to each other via a bus 218 so that information can be transmitted and received between each other.

Various programs 219 such as a printing program and calibration processing shown in a flow chart of FIG. 22, which will be described later, and various kinds of data 220 such as image data to be printed and a known distance from the TOF sensor 204 to the bottom portion 201*a* are stored in the storage device 214.

The controller 217 is a device that performs data processing, and is a processor such as a CPU, for example. The controller 217 executes various programs stored in the storage device 214. The programs 219 in the storage device 214 and the like and the controller 217 using these programs are an example of the controller.

The display 215 is, for example, a liquid crystal display, and can display various kinds of information. The operation device 216 is, for example, a keyboard or a button, and receives input operation by a user. The user can input various instructions to the printing apparatus 200 by operating the operation device 216.

<Control Contents of Controller>

Figure 22:
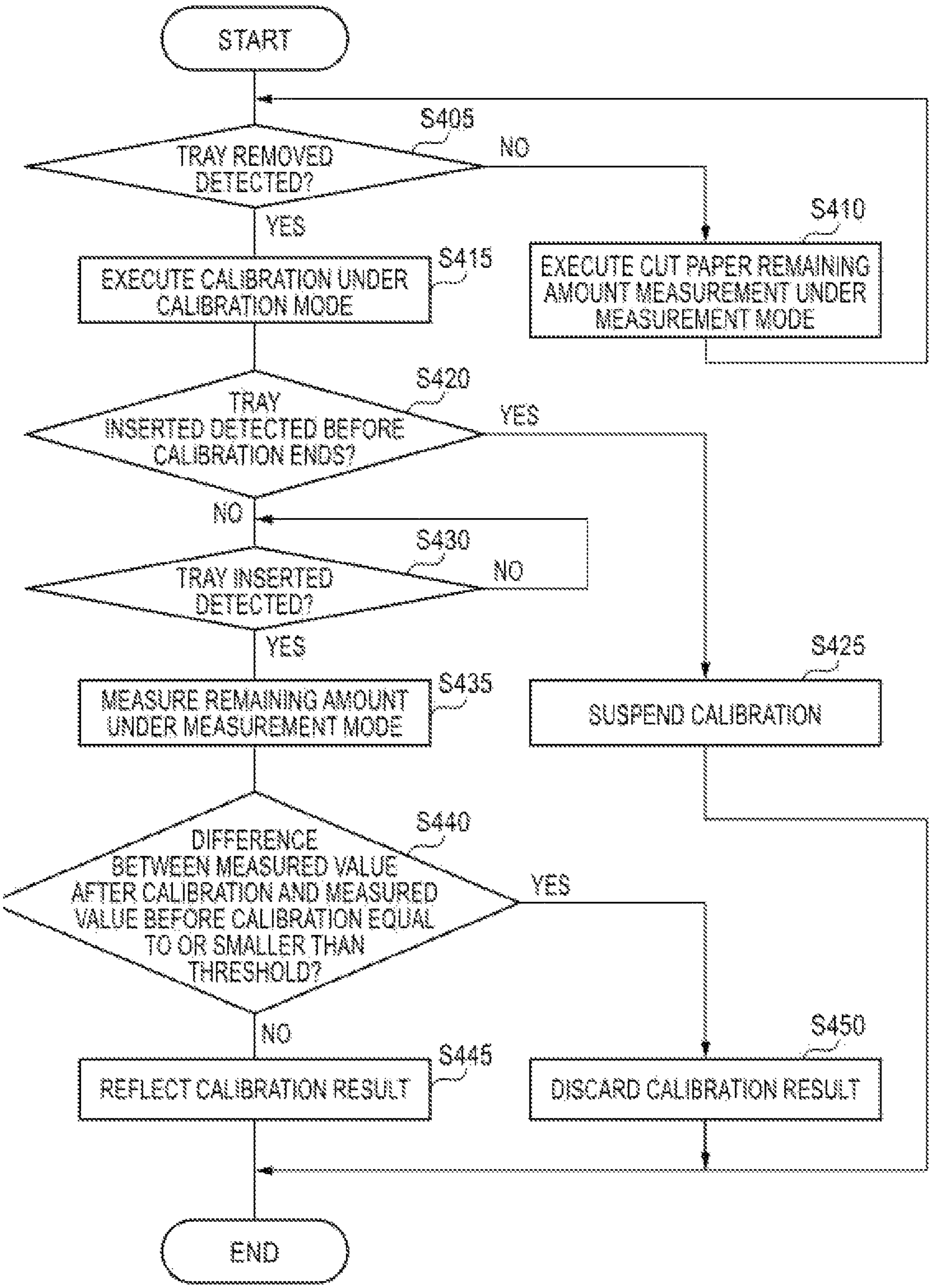
FIG. 22 is a flow chart showing an example of control contents executed by a controller of the printing apparatus according to the fourth embodiment of the present disclosure.

FIG. 22 shows an example of control contents executed by the controller 217 of the printing apparatus 200.

In a step S405, the controller 217 determines whether the tray 202 is removed from the housing 201 based on the detection result of the attachment and detachment sensor 207. If it is detected that the tray 202 is inserted into the housing 201 (step S405: No), the controller 217 proceeds to a step S410.

In the step S410, the controller 217 sets the processing mode to the "measurement mode", and measures a remaining amount of the cut paper P2 in the paper support 203 based on a detection result of a distance to the sheet body S by the TOF sensor 204. The step S410 is an example of the remaining amount detection processing. Then, the controller 217 returns to the step S405.

On the other hand, in the step S405, if it is detected that the tray 202 is removed from the housing 201 (step S405: Yes), the controller 217 proceeds to a step S415.

In the step S415, the controller 217 sets the processing mode to the "calibration" mode, and execute calibration for correcting the distance detection deviation of the TOF sensor 204 based on the detection result of the distance to the bottom portion 201*a* by the TOF sensor 204 when the tray 202 is removed from the housing 201, and the predetermined value of the distance read from the storage device 214. The step S415 is an example of the calibration processing.

In a step S420, the controller 217 determines whether the tray 202 is inserted into the housing 201 before the calibration ends, based on a detection result of the attachment and detachment sensor 207. If it is detected that the tray 202 is inserted before the calibration ends (step S420: Yes), the controller 217 proceeds to a step S425.

In the step S425, the controller 217 suspends the calibration. Then, this flow chart ends.

On the other hand, in the step S420, if it is not detected that the tray 202 is inserted into the housing 201 before the calibration ends, in other words, the calibration ends with the tray 202 removed from the housing 201 (step S420: No), the controller 217 proceeds to a step S430.

In the step S430, the controller 217 determines whether the tray 202 is inserted into the housing 201 based on the detection result of the attachment and detachment sensor 207. The controller 217 waits in the step S430 until the tray 202 is inserted into the housing 201 (step S430: No), and if it is detected that the tray 202 is inserted into the housing 201 (step S430: Yes), the controller 217 proceeds to a step S435.

In the step S435, the controller 217 sets the processing mode to the "measurement mode", and measures the remaining amount of the cut paper P2 in the paper support 203 based on a detection result of a distance to the sheet body S by the TOF sensor 204. The measurement of the remaining amount may be performed only once, or may be performed a plurality of times.

In a step S440, the controller 217 compares the measured value of the remaining amount of the cut paper P2 immediately before executing the calibration in the step S415 and the measured value of the remaining amount of the cut paper P2 in the step S435 after executing the calibration, and then determines whether a difference therebetween is equal to or less than a threshold. If the difference between the measured values of the remaining amount is greater than the threshold (step S440: No), the controller 217 proceeds to a step S445.

Note that in the step S440, instead of comparing the measured values of the remaining amount before and after the calibration, distance values to the sheet body S detected by the TOF sensor 204 before and after the calibration may be compared. In this case, the distance value detected before the calibration is an example of the first distance, the distance value detected after the calibration is an example of the second distance, and the step S440 is an example of the distance comparison processing.

In a step S445, the controller 217 reflects a result of the calibration executed in the step S415 to correct the distance detection deviation of the TOF sensor 204. Then, this flow chart ends.

On the other hand, in the step S440, if the difference between the measured values of the remaining amount is equal to or less than the threshold (step S440: Yes), the controller 217 proceeds to a step S450.

In the step S450, the controller 217 discards the result of the calibration executed in the step S415 and does not correct the distance detection deviation of the TOF sensor 204. That is, when the difference between the measured values of the remaining amount is equal to or less than the threshold, for example, it is assumed that after the tray 202 is removed from the housing 201 by the user, the tray 202 is reinserted into the housing 201 without increasing or decreasing the amount of the cut papers P2, that is, so-called resetting is performed. In this case, if correction by the calibration is performed, detected distances before and after the resetting may vary, even if the sheet body S has the same amount of cut papers P2 as before. By not performing correction by the calibration in the step S450, it is possible to prevent the occurrence of variations in the detected distance. Then, this flow chart ends.

Note that the steps S445 and S450 are an example of the reflection determination processing.

According to the printing apparatus 200 of the present embodiment, since the distance detection deviation in the TOF sensor 204 is corrected by executing the calibration processing, it is possible to optically and accurately detect the distance to the sheet body S, which is the object to be detected. As a result, the remaining amount of cut paper P2 can be detected with high accuracy.

In addition to the methods already described above, the methods according to the above embodiments and modifications may be appropriately combined and used.

Note that in the above description, when there are descriptions such as "perpendicular", "parallel", and "flat", the descriptions do not have a strict meaning. In other words, "perpendicular," "parallel," and "flat" mean "substantially perpendicular," "substantially parallel," and "substantially flat," with allowance for design and manufacturing tolerances and errors.

In the above description, when there are descriptions such as "same", "equal", and "different" in terms of external dimensions and sizes, the descriptions do not have a strict meaning. That is, the terms "same", "equal", and "different" mean "substantially the same", "substantially equal", and "substantially different", with allowance for design and manufacturing tolerances and errors.

Although not exemplified one by one, the present disclosure can be implemented with various modifications within the scope of the present disclosure.

What is claimed is:

1. A printing apparatus comprising:
- a paper support configured to support a sheet body in which a sheet medium is wound in a roll or a plurality of sheet media are stacked;
- a TOF sensor configured to detect a distance to the sheet body;
- a conveyor configured to convey the sheet medium in the sheet body accommodated in the paper support;
- a printing device configured to print on the sheet medium conveyed by the conveyor;
- a housing configured to enclose the paper support, the conveyor, and the printing device, the housing having an opening; and
- a cover configured to open and close the opening, and
- a controller, wherein
- the controller is configured to execute
  - remaining amount detection processing that detects a remaining amount of the sheet medium in the sheet body in the paper support based on a detection result of a distance to the sheet body by the TOF sensor, and
  - calibration processing that corrects a distance detection deviation of the TOF sensor based on a detection result of a distance to a predetermined detection object by the TOF sensor in a predetermined state in which the distance from the TOF sensor to the predetermined detection object is a predetermined value,
- wherein, the predetermined state is
  - a state in which the cover is opened from a close state, or
  - a state in which the cover is closed from an open state, and
- wherein, the predetermined detection object is a relative displacement member, the relative displacement member being configured such that whose position relative to the TOF sensor changes in interlock with the open state or the close state of the cover.

2. The printing apparatus according to claim 1, wherein the controller is configured to execute
- distance comparison processing that compares a first distance to the sheet body detected by the TOF sensor before executing the calibration processing, with the second distance to the sheet body detected by the TOF sensor after executing the calibration processing, and reflection determination processing that determines whether to reflect the correction on the calibration processing in the subsequent remaining amount detection processing according to a comparison result in the distance comparison processing.

3. A printing apparatus comprising:

a paper support configured to support a sheet body in which a sheet medium is wound in a roll or a plurality of sheet media are stacked;

a housing configured to enclose the paper support;

a cover configured to open and close;

a TOF sensor configured to detect a distance; and a shutter configured to cover the TOF sensor, wherein the shutter is configured to be positioned at a first position where the shutter relatively covers the TOF sensor, and a second position where shutter relatively does not cover the TOF sensor, in interlock with the opening or the closing of the cover.

4. The printing apparatus according to claim 3, further comprising:

a controller, wherein the controller is configured to execute calibration processing that corrects a distance detection deviation of the TOF sensor based on a detection result of a distance to the shutter by the TOF sensor at the first position.

* * * * *